(12) United States Patent
Yamaguchi et al.

(10) Patent No.: US 10,176,539 B2
(45) Date of Patent: Jan. 8, 2019

(54) POWER SUPPLY SYSTEM

(71) Applicant: SOFTBANK Corp., Tokyo (JP)

(72) Inventors: Norio Yamaguchi, Tokyo (JP); Sadao Osawa, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 643 days.

(21) Appl. No.: 14/770,551

(22) PCT Filed: Feb. 19, 2014

(86) PCT No.: PCT/JP2014/053906
§ 371 (c)(1),
(2) Date: Aug. 26, 2015

(87) PCT Pub. No.: WO2014/132859
PCT Pub. Date: Sep. 4, 2014

(65) Prior Publication Data
US 2016/0225104 A1 Aug. 4, 2016

(30) Foreign Application Priority Data

Feb. 27, 2013 (JP) .................................. 2013-037698
Feb. 4, 2014 (JP) .................................. 2014-019449

(51) Int. Cl.
*G06Q 50/06* (2012.01)
*H02J 3/00* (2006.01)
(Continued)

(52) U.S. Cl.
CPC .......... *G06Q 50/06* (2013.01); *B60L 11/1824* (2013.01); *B60L 11/1846* (2013.01);
(Continued)

(58) Field of Classification Search
CPC .................................................... G06Q 20/10
(Continued)

(56) References Cited

U.S. PATENT DOCUMENTS

| 2008/0231230 A1* | 9/2008 | Gale | H02J 7/0072 |
| | | | 320/109 |
| 2010/0145568 A1* | 6/2010 | Watanabe | G07C 5/085 |
| | | | 701/29.6 |
| 2014/0188699 A1* | 7/2014 | Langgood | G06F 17/00 |
| | | | 705/39 |

FOREIGN PATENT DOCUMENTS

JP 4848182 B2 10/2011
JP 2011-227557 A 11/2011
(Continued)

OTHER PUBLICATIONS

Kuchta, R., Vrba, R., "Measuring and monitoring system for electric cars", Jan. 1, 2003, 4th IEEE International Symposium on Diagnostics for Electric Machines, Power Electronics and Drives, 2003 SDEMPED 2003. pp. 342-344 (Year: 2003).*

(Continued)

*Primary Examiner* — Eric T Wong
*Assistant Examiner* — Kevin T Poe
(74) *Attorney, Agent, or Firm* — Muirhead and Saturnelli, LLC

(57) ABSTRACT

Power supply systems capable of performing various modes of fee-charging are provided. A fee-charging apparatus memorizes two or more kinds of power-use-side identification information of a use side using the power supplied via the power-supply control apparatus, two or more kinds of power-supply-side identification information of a supply side supplying the power via the power-supply control apparatus, and fee-charge-target information predetermined to each of combination sets between the two or more kinds of power-use-side identification information and the two or more kinds of power-supply-side identification information. The fee-charging apparatus receives at least one of the two or more kinds of power-supply-side identification information, at least one of the two or more types of power-use-side
(Continued)

identification information and power-use information relating to power supplied from the power supply source to the power supply target, from the power-supply control apparatus via a wired or wireless communication line. The fee-charging apparatus performs a fee-charging process based on the at least one kind of power-supply-side identification information, the at least one kind of power-use-side identification information and the power-use information.

19 Claims, 8 Drawing Sheets

(51) Int. Cl.
*B60L 11/18* (2006.01)
*G06Q 20/14* (2012.01)
*H02J 7/00* (2006.01)
*H02J 13/00* (2006.01)

(52) U.S. Cl.
CPC ........ B60L 11/1848 (2013.01); G06Q 20/145 (2013.01); H02J 3/008 (2013.01); *B60L 2230/40* (2013.01); *B60L 2240/70* (2013.01); *H02J 7/0004* (2013.01); *H02J 13/002* (2013.01); *H02J 13/0055* (2013.01); *H02J 13/0062* (2013.01); *H02J 13/0072* (2013.01); *H02J 13/0075* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
USPC .......................................................... 705/39
See application file for complete search history.

(56) References Cited

FOREIGN PATENT DOCUMENTS

| JP | 2011-229268 A | 11/2011 | |
|---|---|---|---|
| JP | 2012-98798 | 5/2012 | |
| JP | 2013-25487 A | 2/2013 | |
| WO | WO-2011132572 A1 * | 10/2011 | ............. G06Q 10/06 |

OTHER PUBLICATIONS

Rodriguez-Ascariz JM, Boquete-Vasquez, L, "Transforming PC Power Supplies Into Smart Car Battery Conditioners",Aug. 1, 2011, IEEE Transactions on Education, vol. 54, Issue 3 pp. 366-373 (Year: 2011).*

"IEEE Standard for Passenger Train Auxiliary Power Systems Interfaces", Jan. 1, 2000, IEEE Std 1476-2000 (Year: 2000).*

* cited by examiner

POWER SUPPLY SYSTEM

TECHNICAL FIELD

The present invention relates to power supply systems capable of supplying an electric power to a power supply target such as an electric apparatus, an electrically driven vehicle such as an electric car or the like.

BACKGROUND ART

A power supply system provided with a power supply apparatus, a power-use apparatus and a fee-charging apparatus is conventionally known (Patent Literature 1). The power supply apparatus is connected to a predetermined power system and receives power supply from the power system, the power-use apparatus receives power supply from the power supply apparatus and supplies the supplied power to outside, and the fee-charging apparatus performs a charging of power-use fee in accordance with a power-use time when receiving power supply from the power supply apparatus by using the power-use apparatus. In this power supply system, a supply identifier assigned to the power supply apparatus, a use identifier assigned to the power-use apparatus and information about start and end of the power supply are transmitted and received between the power supply apparatus and the power-use apparatus through a power line for supplying an electric power. The transceived supply identifier, use identifier and information about start and end of the power supply are notified to the fee-charging apparatus from the power supply apparatus or the power-use apparatus via a communication line. The fee-charging apparatus performs the charging of power-use fee to a user corresponding to the notified use identifier, in accordance with the power-use time, current value or electric energy when receiving power supply from the power supply apparatus to which the notified supply identifier is assigned, and a fee-charging unit price of the power supply apparatus to which the notified supply identifier is assigned.

CITATION LIST

Patent Literature

Patent Literature 1: Japanese Patent No. 4848182.

SUMMARY OF INVENTION

Technical Problem

The conventional power supply system described in the Patent Literature 1 performs the charging of power-use fee to the user, in accordance with the power-use time, current value or electric energy when receiving a power supply from the power supply apparatus, and the fee-charging unit price of the power supply apparatus. However, in power supply from a power supply apparatus, various modes of fee-charging such as a fee-charging not to a user but to a power supply target (for example, a battery of an electrically driven vehicle) is desired. The conventional power supply system is not capable of coping with these various modes of fee-charging.

Solution To Problem

A power supply system according to an aspect of the present invention is a power supply system of supplying power from a power supply source to a power supply target that comprises a power-supply control apparatus of controlling power supply from the power supply source to the power supply target, a fee-charging apparatus of performing a fee-charging process for power supply from the power supply source to the power supply target. The fee-charging apparatus comprises means for memorizing two or more kinds of power-use-side identification information of a use side using the power supplied via the power-supply control apparatus, two or more kinds of power-supply-side identification information of a supply side supplying the power via the power-supply control apparatus, and fee-charge-target information predetermined to each of combination sets between the two or more kinds of power-use-side identification information and the two or more kinds of power-supply-side identification information; means for receiving at least one of the two or more kinds of power-supply-side identification information, at least one of the two or more types of power-use-side identification information and power-use information relating to power supplied from the power supply source to the power supply target, from the power-supply control apparatus via a wired or wireless communication line; and means for performing a fee-charging process based on the at least one kind of power-supply-side identification information, the at least one kind of power-use-side identification information and the power-use information. The power-supply control apparatus comprises switching means for opening and closing a power supply path from the power supply source to the power supply target; control means for controlling the switching means; means for acquiring the at least one kind of power-supply-side identification information, the at least one kind of power-use side identification information, and the power-use information; and means for transmitting the at least one kind of power-supply-side identification information, the at least one kind of power-use-side identification information and the power-use information, to the fee-charging apparatus via a wired or wireless communication line.

In this power supply system, the fee-charging apparatus is capable of determining a fee-charging target corresponding to each of various combination sets between the two or more kinds of power-use-side identification information and the two or more kinds of power-supply-side identification information. Furtheremore, the fee-charging apparatus is capable of performing a fee-charging process for a fee-charge target corresponding to a combination set of the at least one kind of power-supply-side identification information and the at least one kind of power-use-side identification information, based on the power-use information, when receiving the at least one kind of power-supply-side identification information, the at least one kind of power-use-side identification information and the power-use information, from the power-supply control apparatus via the wired or wireless communication line.

Therefore, it is capable of performing various modes of fee-charging for mutually different combination sets between the power-use-side identification information and the power-supply-side identification information.

The foregoing power supply system may further comprise authentication means for performing an authentication process of determining whether or not to permit the power supply from the power supply source to the power supply target. In this power supply system, the authentication means may comprise means for memorizing the foregoing two or more kinds of power-use-side identification information, the foregoing two or more kinds of power-supply-side identification information, and power-supply-permission information that is predetermined for each of combination sets between the two or more kinds of power-use-side identification information and the two or more kinds of power-supply side identification information; and may perform the foregoing authentication process based on the foregoing at least one kind of power-use-side identification information acquired by the foregoing power-supply control apparatus. The foregoing control means of the power-supply control apparatus may control the foregoing switching means based on a result of the authentication process by the authentication means.

In this power supply system, the fee-charging apparatus is capable of determining a fee-charge target corresponding to each of various combination sets between the two or more kinds of power-use-side identification information and the two or more kinds of power-supply-side identification information. The foregoing fee-charging apparatus is capable of performing a fee-charging process for a fee-charge target corresponding to a combination set between the at least one kind of power-supply-side identification information and the at least one kind of power-use-side identification information, based on the power-use information, when receiving the at least one kind of power-supply-side identification information, the at least one kind of power-use-side identification information and the power-use information, from the power-supply control apparatus via a wired or wireless communication line. Therefore, it is capable of performing various modes of fee-charging for mutually different combination sets of the power-use-side identification information and the power-supply-side identification information.

Furthermore, it is capable of performing an authentication of determining whether or not to permit a power supply from the power supply source to the power supply target for each of the various combination sets of the two or more kinds of power-use-side identification information, before supplying the power from the power supply source to the power supply target by controlling the switching means.

In the foregoing power supply system, the authentication means may memorize theft-occurrence information for the power supply target, determine whether the power supply target is stolen or not based on the at least one kind of power-use-side identification information, and perform the authentication process so as not to permit the power supply to the power supply target when determining that the power supply target is a stolen one. In this power supply system, it is capable of preventing an unauthorized power use of supplying a power to a stolen power supply target, and suppressing an occurrence itself of stealing the power supply target.

In the foregoing power supply system, the foregoing authentication means may memorize the theft-occurrence information and a predetermined additional process level when a theft of the power supply target occurs and perform an additional process based on the additional process level for the power supply target, together with the foregoing authentication process, when determining the power supply target is stolen. In this power supply system, it is capable of performing an appropriate additional process according to a kind or the like of the power supply target as well as permitting no power supply to the power supply target, when the power supply target is a stolen one.

The foregoing power supply system may further comprise means for notifying to a predetermined notification destination when determining that the foregoing power supply target is a stolen one. In this power supply system, the owner of the stolen power supply target, a police agency, etc. can be informed that a power supply to the power supply target is requested.

In the foregoing power supply system, the foregoing power-supply control apparatus may further comprise imaging means for imaging the power supply target and the foregoing authentication means may acquire image data of the power supply target that is imaged by the imaging means. In this power supply system, it is capable specifying the power supply target with high accuracy by using the image data of the power supply target, when performing the authentication process of determining whether a power supply from the power supply source to the power supply target is permitted or not.

In the foregoing power supply system, the foregoing power supply target may be a rechargeable battery installed in a vehicle, the body of the vehicle may comprise means for transmitting vehicle identification information unique to the vehicle body, the battery may comprise means for transmitting battery identification information unique to the battery, and the foregoing at least one kind of power-use-side identification information acquired by the foregoing power-supply control apparatus may include at least one of the vehicle identification information and the battery identification information. In this power supply system, it is capable of performing an authentication for each of various combination sets between two or more kinds of vehicle bodies and two or more kinds of batteries.

The foregoing power supply system may further comprise a transmitting apparatus that transmits user identification information unique to a user, and the foregoing at least one kind of power-use-side identification information acquired by the power-supply control apparatus may include the user identification information transmitted from the transmitting apparatus. In this power supply system, it is capable of acquiring user identification information easily by using the transmitting apparatus and performing an authentication process considering the user identification information.

In the foregoing power supply system, the foregoing authentication means may perform the authentication process based on the at least one kind of power-supply-side identification information and the at least one kind of power-use-side identification information that are acquired by the foregoing supply control apparatus. In this power supply system, it is capable of performing an authentication process considering the power-supply-side identification information as well as the power-use-side identification information.

In the foregoing power supply system, the at least one kind of power-use-side identification information and the at least one kind of power-supply-side identification information may be acquired by receiving a response to the acquisition request or a spontaneous transmission from the power-supply control apparatus. In this power supply system, it is capable of acquiring the power-use-side identification information and the power-supply-side identification information at a predetermined timing needed by the power-supply control apparatus, by receiving the response to the acquisition request from the power-supply control apparatus. Furthermore, it is capable of acquiring the power-use-side identification information and the power-supply-side identification information by receiving the spontaneous transmission without transmitting an acquisition request from the power-supply control apparatus.

In the foregoing power supply system, the foregoing power-supply control apparatus may acquire the at least one kind of power-use-side identification information and the at least one kind of power-supply-side identification information by a communication via a power supply cable connecting between the power-supply control apparatus and the power supply target, a near field wireless communication with radio waves or light, an electric field communication, a wireless LAN communication, or a communication with sound or vibration. In this power supply system, it is capable of performing a communication for acquiring the power-use-side identification information and the power-supply-side identification information without connecting a dedicated communication line for an acquisition of the identification information.

In the foregoing power supply system, the foregoing authentication means may be provided in the power-supply control apparatus. In this power supply system, since the authentication process can be performed in the power-supply control apparatus, it is not required to provide a server for performing the authentication process separately.

In the foregoing power supply system, the foregoing authentication means may be a server capable of communicating with the power-supply control apparatus via at least one of a mobile communication network and a wireless LAN. In this power supply system, it is capable of centralizedly managing a power supply from the power-supply control apparatus to the power supply target with respect to the two or more power-supply control apparatuses. Furthermore, since it is capable of performing a wireless communication between the power-supply control apparatus and the server even when an installation location of the power-supply control apparatus is changed, a degree of freedom in the installation location of the power-supply control apparatus is enhanced.

In the foregoing power supply system, the two or more kinds of power-use-side identification information may have the same format each other. In this power supply system, it is capable of easily performing a process of selecting a fee-charging target from the two or more kinds of power-use-side identification information and a process of switching the fee-charging target between the two or more kinds of power-use-side identification information.

In the foregoing power supply system, the two or more kinds of power-supply-side identification information may include identification information unique to the power supply source, identification information unique to the power-supply control apparatus, and identification information unique to an electric energy-measurement apparatus that measures an electric energy of power supplied from the power supply source to the power supply target. In this power supply system, it is capable of performing various modes of fee-charging for mutually different combination sets between the identification information of power supply source, the identification information of power-supply control apparatus and the identification information of electric energy measurement apparatus.

In the foregoing power supply system, the two or more kinds of power-use-side identification information may include identification information unique to a user using a power, identification information unique to a user apparatus used by the user and identification information unique to the power supply target. In this power supply system, it is capable of performing various modes of fee-charging for mutually different combination sets between the identification information of user, the identification information of user apparatus and the identification information of power supply target.

In the foregoing power supply system, the fee-charging target is characterized by being the user or the power supply target. In this power supply system, it is capable of performing various modes of fee-charging for mutually different combination sets between the power-use-side identification information and the power-supply-side identification information, for a user or power supply target as a fee-charging target.

In the foregoing power supply system, the foregoing communication between the power-supply control apparatus and the fee-charging apparatus may be at least one of a mobile communication network and a wireless LAN. In this power supply system, since it is capable of performing a wireless communication between the power-supply control apparatus and the fee-charging apparatus even when an installation location of the power-supply control apparatus is changed, a degree of freedom in the installation location of the power-supply control apparatus is enhanced.

ADVANTAGEOUS EFFECTS OF INVENTION

According to the present invention, it is capable of performing various modes of fee-charging.

DESCRIPTION OF EMBODIMENTS

Hereinafter, embodiments of the present invention will be described with reference to the drawings.

Figure 1:
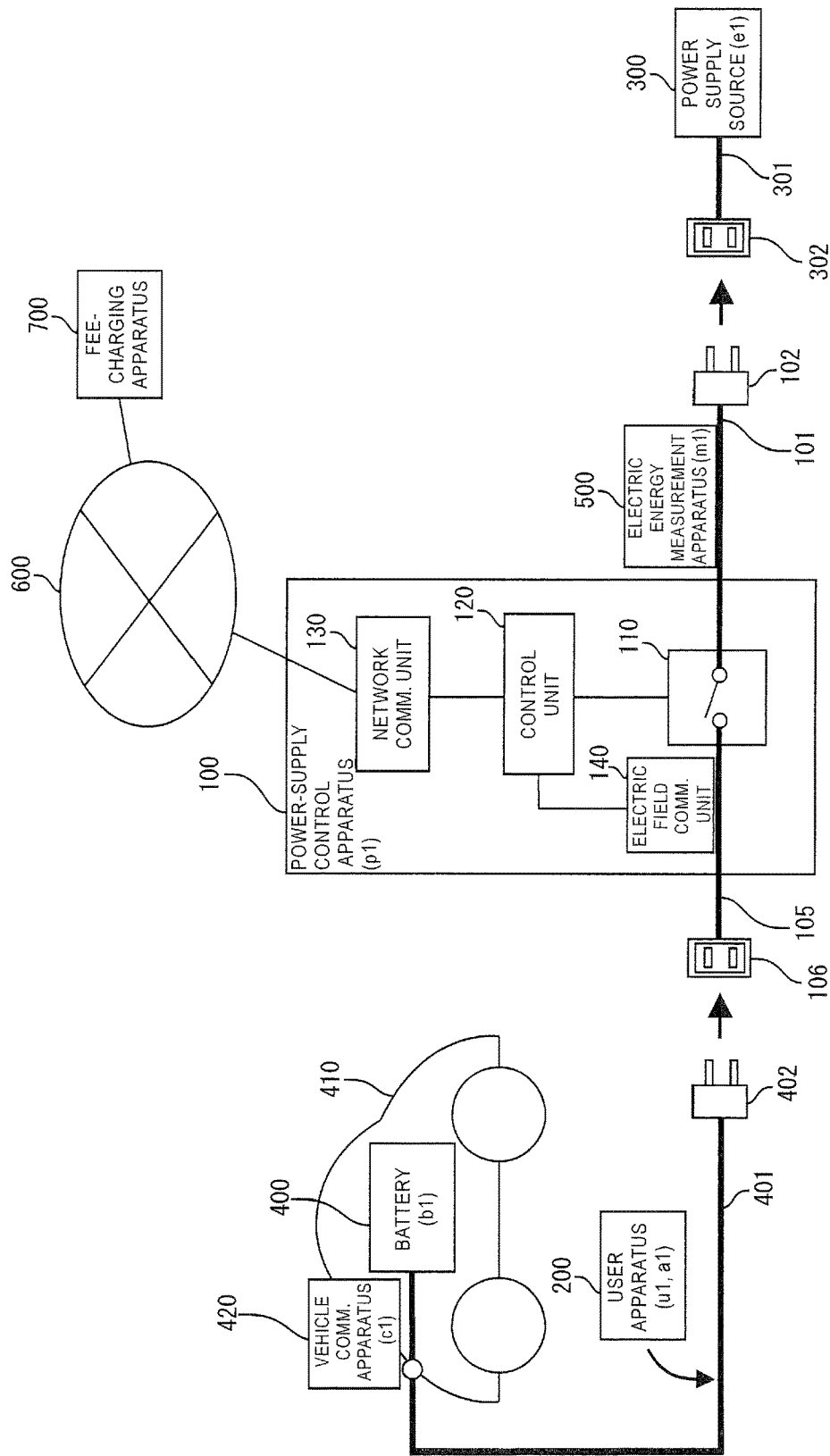
FIG. 1 is a schematic diagram showing one example of a power supply system according to a first embodiment of the present invention.

FIG. 1 is a schematic diagram showing one example of a power supply system according to a first embodiment of the present invention. FIG. 1 shows a state before utilizing a power supply. It is noted that the following embodiment is described with respect to a case that a power supply target is a battery 400 installed in an electrically driven vehicle 410 such as a four-wheel vehicle, three-wheel vehicle (tricycle), two-wheel vehicle (motorcycle, bicycle) or the like, and the present invention is applicable in cases where the power supply target is a home electric appliance such as an electric refrigerator, air conditioner, etc., office equipment such as a copying machine, a communication terminal apparatus such as a mobile telephone, and so on. The battery 400 may be owned by the user, leased from a leasing company and supplied from a different business operator.

In FIG. 1, the power supply system according to the first embodiment includes a power-supply control apparatus 100 that controls a power supply from a power supply source 300 to a battery 400 through cables 101, 105, 301, 401. The power supply system further includes a user apparatus 200 available for a user using a power and a fee-charging apparatus 700 that performs a fee-charging process with respect to a power supply from the power supply source 300 to the battery 400.

The power-supply control apparatus 100 has a general-purpose power plug 102 at an end of the cable 101 on the power supply source 300 side and a general-purpose power outlet 106 at an end of the cable 105 on the power supply target 400 side. The general-purpose power plug 102 of the power-supply control apparatus 100 may be inserted and connected to the general-purpose power outlet 302 provided at an end of the power cable 301 of the power supply source 300. The general-purpose power outlet 106 of the power-supply control apparatus 100 may be connected with a general-purpose power plug 402 provided at an end of the power cable 401 on the side of the power supply target 400 by inserting the general-purpose power plug 402.

The power-supply control apparatus 100 further includes a switch unit 110 which functions as switching means of opening and closing a power supply path from the power supply source 300 to the battery 400 through the cable, a control unit 120 which functions as control means of controlling the switch unit 110, and a network-communication unit 130 which functions as communication means of communicating with the fee-charging apparatus 700 via a network 600 configured with a wired or wireless communication line.

The switch unit 110 may be configured with, for example, a switch having a normally open relay contact.

The control unit 120 is configured with, for example, a general-purpose microcomputer having a CPU, etc., a dedicated IC circuit element or the like. The control unit 120 may be provided with a memory unit which functions as memory means including a semiconductor memory such as a RAM, ROM, a magnetic disk or the like, and configured so as to read a predetermined program stored in the memory unit and perform a transmitting/receiving process of data and commands, a data processing for a user authentication, a control of the switch unit and so on, in accordance with the program.

The control unit 120 includes a timer which functions as time counting means which is not illustrated. The timer, for example, when receiving an authentication result showing success of the authentication process from the fee-charging apparatus 700 or receiving a connection request from the user apparatus 200, presets a use time included in the connection request, performs a control to turn on the switch unit 110 (for closing the relay) and starts a timer function simultaneously with start of a power supply to the battery 400. Then, a time-up signal is output when expiring the use time and the time is up. Based on the time-up signal, the control unit 120 performs a control to turn off the switch unit 110 (open the relay) and terminates the power supply to the battery 400.

The control unit 120 performs an authentication process of detecting whether a user ID received from the user apparatus 200 matches with a user ID stored in the memory unit. When the both user IDs match each other, the control unit 120 determines that a use of power supply is permitted and controls the switch unit 110 to turn on (for closing the relay). On the other hand, when both user IDs do not match each other, the control unit 120 determines that a use of power supply is not permitted and does not perform the control of the switch unit 110 to turn on (for closing the relay).

The network-communication unit 130 also functions as means for transmitting power-use information relating a power supplied from the power supply source 300 to the battery 400 through the cable and power-use-side identification information, to the fee-charging apparatus 700 via the network 600 configured with a wired or wireless communication line. The foregoing "power-use-side identification information" includes at least one of identification information $a1$ unique to the user apparatus 200 (hereinafter called "user apparatus ID") and identification information $u1$ unique to a user using the user apparatus 200 (hereinafter called "user ID"). The foregoing "power-use information" is information relating a power supplied from the power supply source 300 to the battery 400 through the cable, and is, for example, an accumulated electric energy, date and time, the start time and the finish time of a power supply, a power supply time (=finish time−start time), etc. when supplying a power to the battery 400.

The network-communication unit 130 may be configured so as to communicate via a wired communication line such as an optical line, an ADAL line or the like, or may be configured with a wireless communication module so as to communicate via a wireless communication line. The communication via the wireless communication line may be, for example, a communication via a mobile communication network having the third generation or the fourth generation (for example LTE) cellular system or via a mobile communication network for PHS, or may be a communication via a wireless LAN such as a WiMAX, Wi-Fi or the like.

The power-supply control apparatus 100 includes an electric field communication unit 140 which functions as communication means for communicating with the user apparatus 200, etc. by an electric field communication of communicating via an electric field generated in an external space near the surface of cable. This electric field communication unit 140 functions as means for receiving the foregoing power-use-side identification information from the user apparatus by the electric field communication.

The electric field communication unit 140 is also capable of functioning as means for acquiring identification information unique to the power supply target (hereinafter called "power supply target ID") by the electric field communication. For example, the power-supply control apparatus 100 may acquire identification information $b1$ unique to the battery 400 (hereinafter called "battery ID") as the power supply target ID from the battery 400 by the electric field communication of the electric field communication unit 140. The power-supply control apparatus 100 may also acquire identification information $c1$ unique to a vehicle 410 (hereinafter called "vehicle ID") as the power supply target ID from a vehicle-communication apparatus 420 mounted onto a body, etc. of the vehicle 410 in which the battery 400 is installed, by the electric field communication of the electric field communication unit 140.

The electric field communication unit 140 is also capable of functioning as means for acquiring identification information $e1$ unique to the power supply source 300 (hereinafter called "power supply source ID") by the electric field communication and means for acquiring identification information $m1$ unique to a electric energy-measurement apparatus 500 (hereinafter called "electric energy-measurement apparatus ID") that measures an electric energy of a power supplied from the power supply source 300 to the battery 400, by the electric field communication.

The foregoing electric field communication is a communication using an electric field generated on a surface of an object or a human body, and is also called "human body communication", "human-body near-field communication", "quasi-electrostatic field communication" and so on. The electric field communication unit 140, for example, may be configured with an electric field communication module including a processor, a transceiver, an amplifier, a mixer circuit, a sensor for receiving, etc. necessary for the electric field communication.

The user apparatus 200 is a portable apparatus that can be used by a user of a power. When using a power supply via the power-supply control apparatus 100, the user put the user apparatus 200 close to or into contact with the power cable of the power supply target such as the battery 400. The user apparatus 200 includes an electric field communication unit (not shown) that functions as means for transmitting the user ID or the user apparatus ID to the power-supply control apparatus 100 by the electric field communication. This electric field communication unit too may be configured with, for example, the aforementioned electric field communication module. The user apparatus 200 may be configured so as to include an operation unit such as a button, etc used for instructing a start and stop, etc. of using a power supply. The user apparatus 200 may be a mobile communication terminal such as a mobile telephone, a smartphone, PHS, etc. in which the function of electric field communication is incorporated.

The battery 400 supplies a power to an electric motor that is a drive source of the vehicle 410. The battery 400 includes an electric field communication unit (not shown) that functions as means for transmitting the battery ID to the power-supply control apparatus 100 by the electric field communication. This electric field communication unit too may be configured with, for example, the aforementioned electric field communication module.

The vehicle-communication apparatus 420 is attached onto a casing or the like of the vehicle 410 so as to locate at a position close to or into contact with an external surface of a charging cable 401 connected to the battery 400. The vehicle-communication apparatus 420 includes an electric field communication unit (not shown) which functions as means for transmitting the vehicle ID to the power-supply control apparatus 100 by the electric field communication. This electric field communication unit too may be configured with, for example, the aforementioned electric field communication module.

The power supply source 300 is, for example, connected to a power line which supplies power transmitted from power generation equipment of an electric power company and transformed to a predetermined voltage. The general-purpose power outlet 302 capable of connecting to the power-supply control apparatus 100 by inserting is provided at an end of a power cable 301 of the power supply source 300.

The electric energy-measurement apparatus 500 is an apparatus of measuring an accumulated electric energy [Wh] of power supplied from the power supply source 300 to the power supply target such as the battery 400 or the like. As the electric energy-measurement apparatus 500, for example, an induction type watthour meter, an electronic type watthour meter or the like may be used. The electric energy-measurement apparatus 500 includes an electric field communication unit (not shown) which functions as means for transmitting the vehicle ID to the power-supply control apparatus 100 by the electric field communication. This electric field communication unit too may be configured with, for example, the aforementioned electric field communication module.

The fee-charging apparatus 700 is an apparatus of performing a fee-charging process with respect to a power supply from the power supply source 300 to the power supply target such as the battery 400 or the like. The fee-charging apparatus 700 is configured with, for example, a computer apparatus such as a server and has functions of various kinds of data processing, a communication via the network 600 including a wired or wireless communication line, and a database in which various data are stored so as to be searched.

The fee-charging apparatus 700 receives the user ID or the user apparatus ID as the power-use-side identification information and the power-use information relating to a power supplied from the power supply source 300 to the battery 400 through the cable, from the power-supply control apparatus 100 via the network 600, and performs a fee-charging process based on the power-use-side identification information and the power-use information.

The fee-charging apparatus 700 may be configured so as to perform an authentication process in place of the power-supply control apparatus 100. In this configuration, for example, the fee-charging apparatus 700 performs an authentication process of detecting whether a user ID received from the power-supply control apparatus 100 matches with a user ID stored in the memory unit, and transmits the result of the authentication process to the power-supply control apparatus 100. The power-supply control apparatus 100 performs a control to turn on the switch unit 110 (for closing the relay) when receiving a result showing success of the authentication process that is a result showing that the both user IDs match each other. On the other hand, when the authentication is not succeeded, that is, the both user IDs do not match each other, the control of the switch unit 110 to turn on (for closing the relay) is not performed.

The fee-charging apparatus 700 may further receive at least one of the battery ID and the vehicle ID in addition to the user ID and the user apparatus ID as the power-use-side identification information, from the power-supply control apparatus 100 via the network 600, and may use the power-use-side identification information for the authentication process and the fee-charging process. The fee-charging apparatus 700 may further receive at least one of the power-supply control apparatus ID, the power supply source ID and the electric energy-measurement apparatus ID as the power-supply-side identification information, from the power-supply control apparatus 100 via the network 600, and may use the power-supply-side identification information for the authentication process and the fee-charging process.

The database of the fee-charging apparatus 700 stores, for example, as shown in Table 1, fee-charge setting data including two or more kinds of power-use-side identification information, two or more kinds of power-supply-side identification information, and fee-charge-target information predetermined to each of combination sets between the two or more kinds of power-use-side identification information and the two or more kinds of power-supply-side identification information. In the example of Table 1, a user apparatus ID, a user ID, a power supply target ID (a battery ID and a vehicle ID) are stored as the two or more kinds of poweruse-side identification information, and a power-supply control apparatus ID, a power supply source ID and an electric energy-measurement apparatus ID are stored as the two or more kinds of power-supply-side identification information. As the foregoing fee-charge setting information used for the fee-charging process, a unit price of fee-charging and information on the basis for fee-charging using the unit price (for example, an electric energy or a use time) are also stored in addition to the fee-charging target information.

It is noted that the data accumulated in the power-utilization management table of the database of the fee-charging apparatus 700 may be used for various kinds of analysis of a supply and use of power. For example, by using the data accumulated in the power-utilization management table, it is capable of analyzing a portfolio of power-supply-side (for example, each percentage of power supply sources 300 such as a thermal power generation, a nuclear power generation, a hydroelectric power generation and a solar

TABLE 1

| Power-use side information | | | | Power-supply side information | | | Fee-charge setting information | | |
|---|---|---|---|---|---|---|---|---|---|
| | | Power supply target ID | | Power supply control apparatus ID | Power supply source ID | Electric energy measurement apparatus ID | | | |
| User apparatus ID | User ID | Battery ID | Vehicle ID | | | | Fee-charging target | Unit price | Basis for fee-charging |
| a1 | u1 | b1 | c1 | p1 | e1 | m1 | u1 | *** | Electric energy |
| a1 | u1 | b2 | c2 | p1 | e1 | m1 | b2 | *** | Use time |
| a2 | u2 | b1 | c3 | p1 | e1 | m1 | a2 | *** | Electric energy |
| a2 | u2 | b2 | c4 | p1 | e1 | m1 | a2 | *** | Electric energy |
| ... | ... | ... | ... | ... | ... | ... | ... | ... | ... |
| ... | ... | ... | ... | ... | ... | ... | ... | ... | ... |

The fee-charging apparatus 700 receives at least one kind of the power-supply-side identification information, at least one kind of the power-use-side identification information and the power-use information from the power-supply control apparatus 100, and stores the received information by adding the received information to a power-utilization management table created in the foregoing database, which is exemplified in Table 2. The fee-charging apparatus 700 refers to the fee-charge setting data in the foregoing database based on the power-supply-side identification information and the power-use-side identification information received from the power-supply control apparatus 100, and acquires fee-charging related information such as the fee-charging target. Then, the fee-charging apparatus 700 performs a fee-charging process based on the acquired fee-charging related information and the power-use information received from the power-supply control apparatus 100.

photovoltaic generation) and a portfolio of power-use side (for example, each percentage of various attributes of users, each percentage of various power supply targets), with respect to all users as a whole. It is also capable of analyzing how much each of the users uses an electric energy of a power from which type of the power supply source 300 via which power-supply control apparatus 100.

Figure 2:
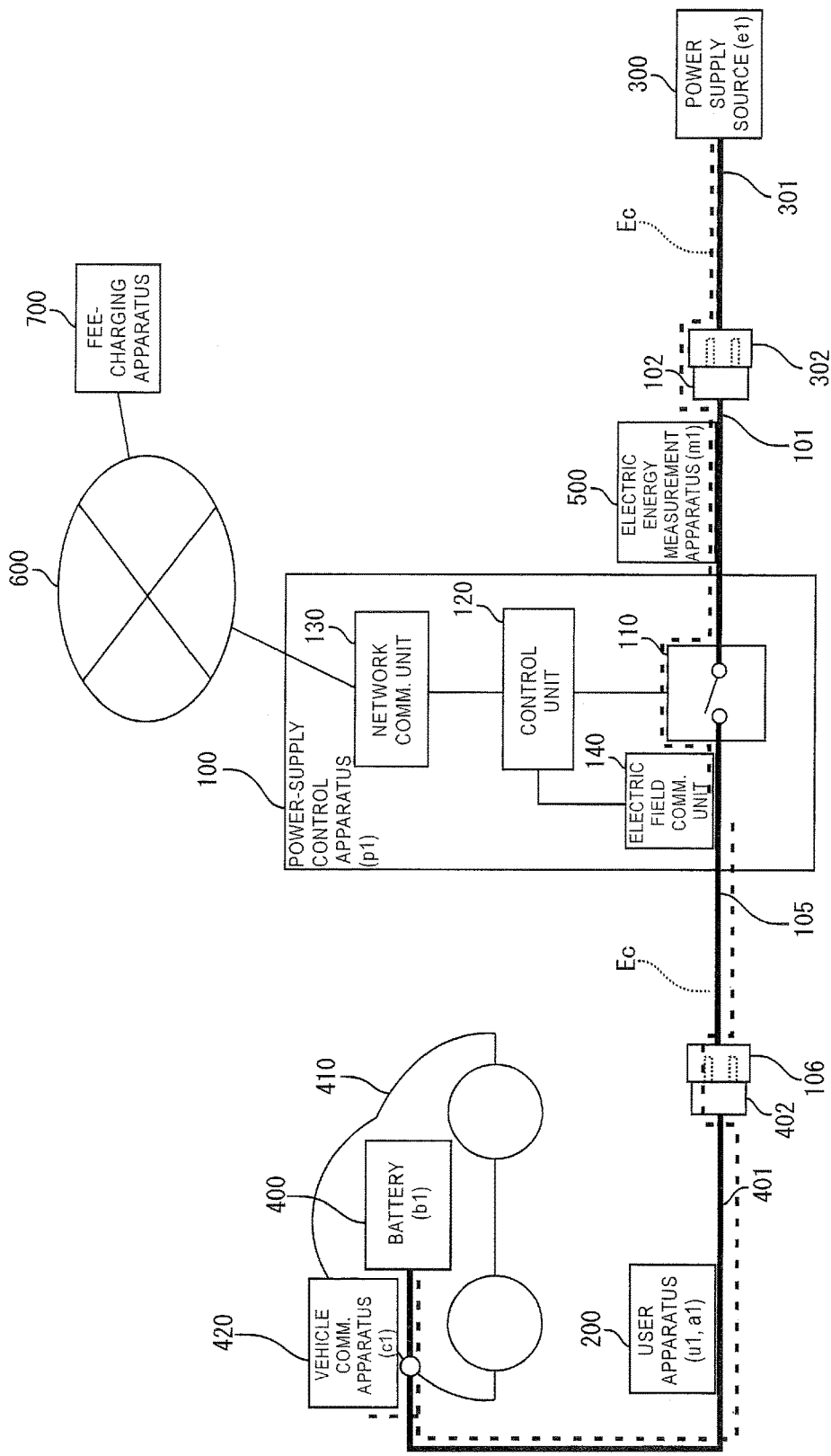
FIG. 2 is a schematic diagram showing a state capable of supplying an electric power in the power supply system of the first embodiment.

FIG. 2 shows is a schematic diagram showing a state capable of supplying an electric power in the power supply system of the first embodiment. A path indicated with a broken line Ec in the figure shows schematically a path capable of communicating by the electric field communication.

In FIG. 2, when connecting the general-purpose power outlet 106 of the cable 105 of the power-supply control apparatus 100 with the general-purpose power plug 402 of the cable 401 connected to the battery 400, the power-supply control apparatus 100 is capable of performing the electric

TABLE 2

| Power-use side information | | | | Power-supply side information | | | Fee-charge information | | | Power supply related information | | |
|---|---|---|---|---|---|---|---|---|---|---|---|---|
| | | Power supply target ID | | Power supply control apparatus ID | Power supply source ID | Electric energy measurement apparatus ID | | | | | | |
| User apparatus ID | User ID | Battery ID | Vehicle ID | | | | Fee-charging target | Unit price | Basis for fee-charging | Use date | Use time (hour) | Electric energy (kWh) |
| a1 | u1 | b1 | c1 | p1 | e1 | m1 | u1 | *** | Electric energy | 2013/1/15 | 3 | 6 |
| a1 | u1 | b2 | c2 | p1 | e1 | m1 | b2 | *** | Use time | 2013/1/20 | 5 | 10 |
| ... | ... | ... | ... | ... | ... | ... | ... | ... | ... | ... | ... | ... |
| ... | ... | ... | ... | ... | ... | ... | ... | ... | ... | ... | ... | ... | field communication with various apparatuses on the power-use side. Specifically, the power-supply control apparatus 100 is capable of transmitting and receiving various data and control commands between the user apparatus 200 held on the cable 401, the battery 400 in the vehicle 410 and the vehicle-communication apparatus 420 mounted onto the vehicle 410, by the electric field communication.

Moreover, when connecting the general-purpose power plug 102 of the cable 101 of the power-supply control apparatus 100 with the general-purpose power outlet 302 of the cable 301 connected to the power supply source 300, the power-supply control apparatus 100 becomes also capable of performing an electric field communication with various apparatuses on the power supply side. Specifically, the power-supply control apparatus 100 is capable of transmitting and receiving various data and control commands between the electric energy-measurement apparatus 500 held on the cable 101 and the electric field communication apparatus (not shown) installed in the power supply source 300 by the electric field communication.

Figure 3:
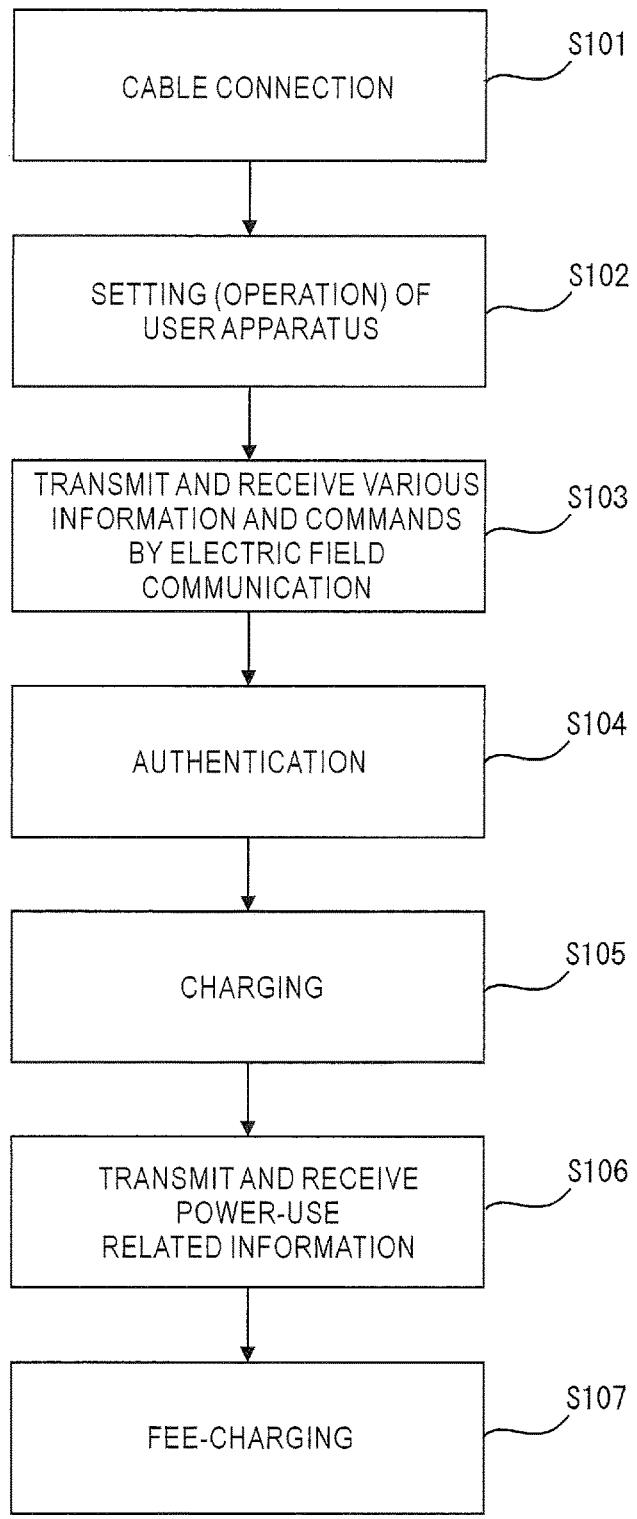
FIG. 3 is a flow chart showing one example of procedures when charging a battery of a vehicle by utilizing a power supplied with the power supply system of the first embodiment.

FIG. 3 is a flow chart showing one example of procedures when charging a battery of a vehicle by utilizing a power supplied with the power supply system of the first embodiment shown in the foregoing FIG. 2.

In FIG. 3, to begin with, a user who desires to charge the battery 400 of the vehicle 410 connects the cables 401 and 105 each other by inserting the general-purpose power plug 402 of the cable 401 for charging to the general-purpose power outlet located at the end portion of the cable 105 of the power-supply control apparatus 100 (S101).

Next, the user performs a setting operation of the user apparatus 200, by which the user apparatus 200 is attached on an arbitrary portion of the cable 401 for charging or is held to be close to a portion of the cable 401 (S102). When the user apparatus 200 is provided with an operation unit such as a button for requesting a start of power supply, the user operates the operation unit of the user apparatus 200 when performing the setting of the user apparatus 200.

Next, various kinds of information and commands are transmitted and received between the power-supply control apparatus 100 and other apparatuses by the electric field communication (S103).

For example, the user apparatus 200 that is set on the cable 401 transmits the user ID or the user apparatus ID preset in the user apparatus 200 to the power-supply control apparatus 100 by the electric field communication, spontaneously or in response to a request command from the power-supply control apparatus 100. At this juncture, the battery 400 may transmit the battery ID preset in the battery 400 to the power-supply control apparatus 100 by the electric field communication, spontaneously or in response to a request command from the user apparatus 200 or the power-supply control apparatus 100. Furthermore, the vehicle-communication apparatus 420 may transmit the vehicle ID preset in the vehicle-communication apparatus 420 to the power-supply control apparatus 100 by the electric field communication, spontaneously or in response to a request command from the user apparatus 200 or the power-supply control apparatus 100.

Moreover, a communication apparatus (not shown) of the power supply source 300 may transmit the power supply source ID preset in this communication apparatus to the power-supply control apparatus 100 by the electric field communication, spontaneously or in response to a request command from the user apparatus 200 or the power-supply control apparatus 100. Further, the electric energy-measurement apparatus 500 may transmit the electric energy-measurement apparatus ID preset in the electric energy-measurement apparatus 500 to the power-supply control apparatus 100 by the electric field communication, spontaneously or in response to a request command from the user apparatus 200 or the power-supply control apparatus 100.

The power-supply control apparatus 100 transmits various kinds of ID information received from the foregoing apparatuses to the fee-charging apparatus 700 via the network 600.

Next, the fee-charging apparatus 700 performs an authentication process of determining whether or not to permit the use of power supply requested by the foregoing user based on the various kinds of ID information received from the power-supply control apparatus 100 and the ID information for authentication stored in the database, and transmits the result of the authentication process to the power-supply control apparatus 100 (S104). The authentication process may be performed by the power-supply control apparatus 100.

Next, the power-supply control apparatus 100 performs a control of the switch unit 110, etc. based on the authentication result received from the fee-charging apparatus 700. For example, when the authentication result is a positive result showing that the authentication process is succeeded, the power-supply control apparatus 100 performs a control to turn on the switch unit 110 (for closing the relay), by which a charge of the battery 400 is started (S105). Then, the power-supply control apparatus 100 performs a control to turn off the switch unit 110 (for opening the relay) at a predetermined timing, by which the charge of the battery 400 is terminated (S105). The predetermined timing for terminating the charge may be a timing when a predetermined charge time elapses from the start of charge, a timing when receiving a command for requesting a termination of the power supply from any one of the apparatuses (for example, the user apparatus 200, the battery 400, the vehicle-communication apparatus 420, the electric energy-measurement apparatus 500) capable of communicating by the electric field communication, a timing when receiving a command for requesting a termination of the power supply from the fee-charging apparatus 700, or the like.

Next, the power-supply control apparatus 100 transmits power-use information relating to power supplied from the power supply source 300 to the battery 400 through the cable, to the fee-charging apparatus 700 via the network 600 (S106). As the foregoing power-use information transmitted to the fee-charging apparatus 700 in this step, for example, an accumulated electric energy, date and time, the start time and the finish time of a power supply, a power supply time (=finish time−start time), or the like when supplying power to the battery 400 can be exemplified. With respect to the accumulated electric energy, the power-supply control apparatus 100 is capable of acquiring the accumulated electric energy from the electric energy-measurement apparatus 500 by the electric field communication.

Next, the fee-charging apparatus 700 performs a fee-charging process based on the power-use information received from the power-supply control apparatus 100 (S107). This fee-charging process may be performed by using various kinds of information received from the power-supply control apparatus 100 when the aforementioned authentication process is performed, in addition to the power-use information.

According to the first embodiment described above, it is capable of controlling a power supply to the battery 400 used by the user and performing a fee-charging with respect to the power supply to the battery 400 used by the user, without providing a conventional power-use apparatus directly connected to a lead wire of a cable. Therefore, it is capable of performing the control and fee-charging with respect to a power supply with fewer restrictions in configuration than a conventional system. Furtheremore, when a user uses a power supply to the battery 400, the user is enough to perform a simple operation of attaching the user apparatus 200 on a surface of the cable 401 or making it close to the surface. Moreover, it is capable of receiving a power supply to the battery 400 even at a location where a conventional power-use apparatus that is directly connected to a lead wire of a cable is not provided. Accordingly, the convenience of a user improves.

According to the first embodiment described above, the fee-charging apparatus 700 is capable of determining a fee-charging target corresponding to each of various combination sets between the two or more kinds of power-use-side identification information and the two or more kinds of power-supply-side identification information. Furtheremore, the fee-charging apparatus 700 is capable of performing a fee-charging process for a fee-charging target corresponding to a combination set between the at least one kind of power-supply-side identification information and the at least one kind of power-use-side identification information based on the power-use information, when receiving the at least one kind of power-supply-side identification information, the at least one kind of power-use-side identification information and the power-use information from the power-supply control apparatus 100 via the network 600 configured with a wired or wireless communication line. Accordingly, it is capable of performing various modes of fee-charging for mutually different combination sets between the power-use-side identification information and the power-supply-side identification information.

It is noted that, in the first embodiment described above, other near field communication method such as a near field wireless communication of FeliCa (registered trademark), RFID of UHF or HF, etc. via radio waves or light, a wireless LAN communication, a communication via sound or vibration, or the like may be used instead of the foregoing electric field communication.

Next, another embodiment of the present invention is described with reference to the drawings.

In a power supply system, there may be a case that it is desired to perform various modes of authentications such as an authentication for a power supply target as well as an authentication for a user, with respect to an authentication process of determining whether a power supply to the power supply target is permitted or not. However, the aforementioned conventional power supply system is not capable of coping with the various modes of authentications.

A second embodiment of the present invention described hereinafter is an example of a power supply system capable of performing various modes of fee-charging and authentication.

Figure 4:
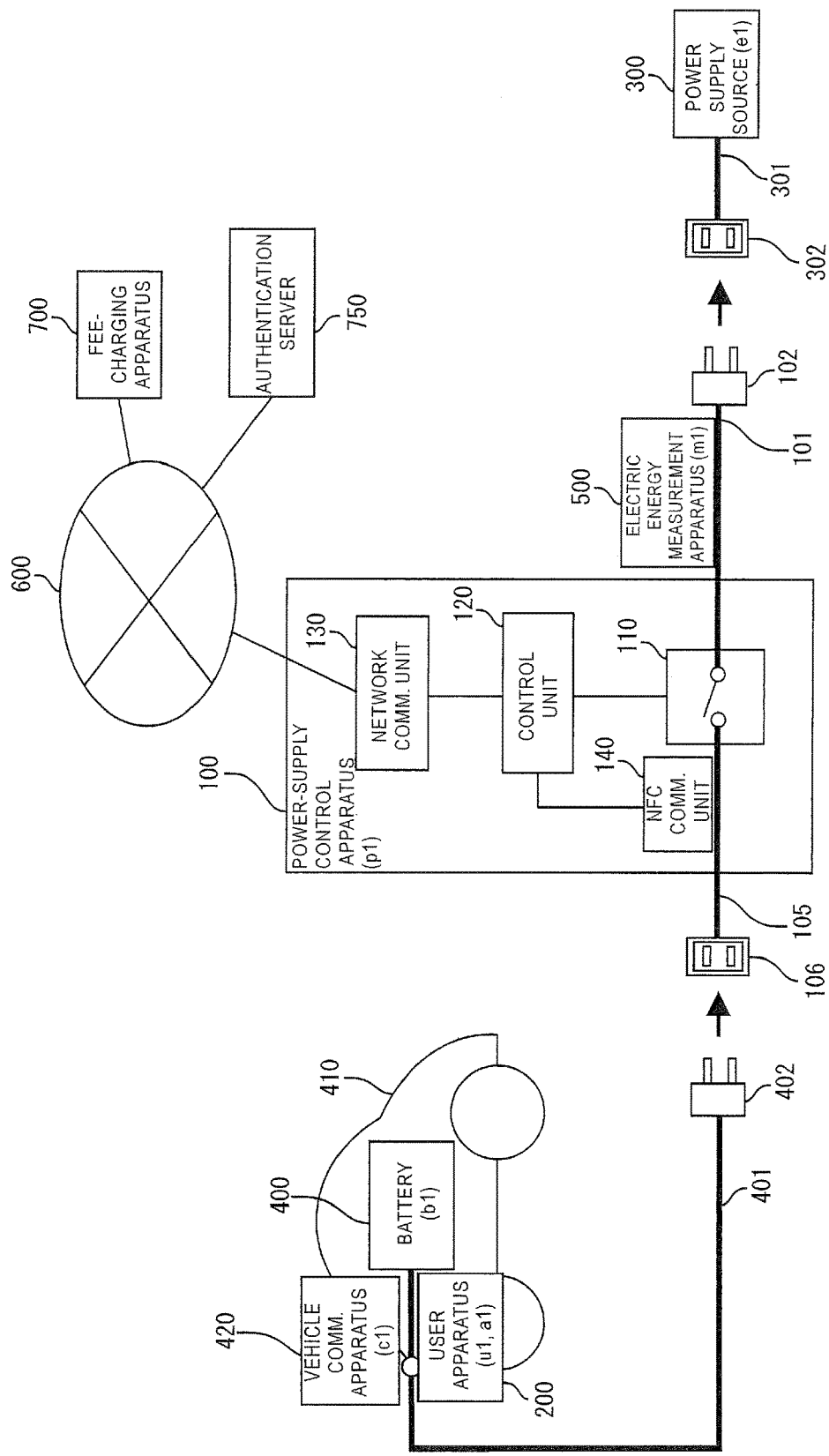
FIG. 4 is a schematic diagram showing one example of a power supply system according to a second embodiment of the present invention.

FIG. 4 is a schematic diagram showing one example of a power supply system according to a second embodiment of the present invention. FIG. 4 shows a state before starting a power supply. It is noted that the following embodiment is described with respect to a case where a power supply target is a battery 400 installed in an electrically driven vehicle 410 such as a four-wheel vehicle, three-wheel vehicle (tricycle), two-wheel vehicle (motorcycle, bicycle) or the like, and the present invention is applicable in cases where the power supply target is a home electric appliance such as a electric refrigerator, air conditioner, etc., an office equipment such as a copying machine and a communication terminal apparatus such as a mobile telephone and so on. The battery 400 may be owned by the user, leased from a leasing company and supplied from a different business operator.

In FIG. 4, the power supply system according to the second embodiment includes a power-supply control apparatus 100 that controls a power supply from a power supply source 300 to a battery 400 through cables 101, 105, 301, 401. The power supply system further includes a user apparatus 200 available for a user using a power, a fee-charging apparatus 700 that performs a fee-charging process with respect to a power supply from the power supply source 300 to the battery 400, and an authentication server 750 function as authentication means.

It is noted that the fee-charging apparatus 700 may be used in common as the authentication server 750 or the authentication server 750 may be used in common as the fee-charging apparatus 700, while the fee-charging apparatus 700 and the authentication server 750 are separately provided in the second embodiment. The fee-charging apparatus 700 and the authentication server 750 may be also integrally configured as a power supply management system. The authentication means may be incorporated in the power-supply control apparatus 100.

The power-supply control apparatus 100 has a general-purpose power plug 102 at an end of the cable 101 on the power supply source 300 side and a general-purpose power outlet 106 at an end of the cable 105 on the power supply target 400 side. The general-purpose power plug 102 of the power-supply control apparatus 100 may be inserted and connected to the general-purpose power outlet 302 provided at an end of the power cable 301 of the power supply source 300. The general-purpose power outlet 106 of the power-supply control apparatus 100 may be connected with a general-purpose power plug 402 provided at an end of the power cable 401 on the side of the power supply target 400 by inserting the general-purpose power plug 402.

The power-supply control apparatus 100 further includes a switch unit 110 which functions as switching means of opening and closing a power supply path from the power supply source 300 to the battery 400 through the cable, a control unit 120 which functions as control means of controlling the switch unit 110, a network-communication unit 130 which functions as communication means of communicating with the fee-charging apparatus 700 and the authentication server 750 via a network 600 configured with a wired or wireless communication line, and a camera (not shown) which functions as imaging means.

The switch unit 110 may be configured with, for example, a switch having a normally open relay contact.

The control unit 120 is configured with, for example, a general-purpose microcomputer having a CPU, etc., a dedicated IC circuit element or the like. The control unit 120 may be provided with a memory unit which functions as memory means including a semiconductor memory such as a RAM, ROM, a magnetic disk or the like, and configured so as to read a predetermined program stored in the memory unit and perform a transmitting/receiving process of data and commands, a data processing for a user authentication, a control of the switch unit and so on, in accordance with the program. The control unit 120 may be also configured with a first control unit connected to the switch unit 110 and an NFC communication unit 140, and a second control unit controlled from the authentication server 750 or the fee-charging apparatus 700 via the network 600. In this configuration, a control between the first control unit and the second control unit is performed, for example, via an API (Application Programming Interface).

The control unit 120 includes a timer which functions as time counting means which is not illustrated. The timer, for example, when receiving an authentication result showing success of the authentication process from the authentication server 750 or the fee-charging apparatus 700, or receiving a connection request from the user apparatus 200, presets a use time included in the connection request, performs a control to turn on the switch unit 110 (for closing the relay) and starts a timer function simultaneously with start of a power supply to the battery 400. Then, a time-up signal is output when expiring the use time and the time is up. Based on the time-up signal, the control unit 120 performs a control to turn off the switch unit 110 (open the relay) and terminates the power supply to the battery 400.

The control unit 120 performs an authentication process of detecting whether a user ID received from the user apparatus 200 matches with a user ID stored in the memory unit. When the both user IDs match each other, the control unit 120 determines that a use of power supply is permitted and controls the switch unit 110 to turn on (for closing the relay). On the other hand, when both user IDs do not match each other, the control unit 120 determines that a use of power supply is not permitted and does not perform the control of the switch unit 110 to turn on (for closing the relay).

The network-communication unit 130 also functions as means for transmitting power-use information relating a power supplied from the power supply source 300 to the battery 400 through the cable and power-use-side identification information, to the fee-charging apparatus 700 or the authentication server 750 via the network 600 configured with a wired or wireless communication line. The foregoing "power-use-side identification information" includes at least one of identification informational unique to the user apparatus 200 ("user apparatus ID ") and identification information u1 unique to the user using the user apparatus 200 ("user ID"). The foregoing "power-use information" is information relating a power supplied from the power supply source 300 to the battery 400 through the cable, and is, for example, an accumulated electric energy, date and time, the start time and the finish time of a power supply, a power supply time (=finish time–start time), etc. when supplying a power to the battery 400.

The network-communication unit 130 also functions as means for notifying to a predetermined notification destination via the network 600 configured with a wired or wireless communication line when determining that the power supply target is a stolen one.

The network-communication unit 130 may be configured so as to communicate via a wired communication line such as an optical line, an ADAL line or the like, or may be configured with a wireless communication module so as to communicate via a wireless communication line. The communication via the wireless communication line may be, for example, a communication via a mobile communication network having the third generation or the fourth generation (for example LTE) cellular system or via a mobile communication network for PHS, or may be a communication via a wireless LAN such as a WiMAX, Wi-Fi or the like.

The power-supply control apparatus 100 includes an NFC (Near Field Communication) unit 140 which functions as communication means for communicating with the user apparatus 200 or the like. This NFC communication unit 140 functions as means for receiving the foregoing power-use-side identification information from the user apparatus 200 by a predetermined near field communication method.

The NFC communication unit 140 is also capable of functioning as means for acquiring identification information (power supply target ID) unique to the power supply target by a predetermined near field communication method. For example, the power-supply control apparatus 100 is capable of acquiring identification information (battery ID) b1 unique to the battery 400 as the power supply target ID from the battery 400 by the NFC communication unit 140. The power-supply control apparatus 100 is also capable of acquiring identification information (vehicle ID) c1 unique to a vehicle 410 as the power supply target ID from a vehicle-communication apparatus 420 mounted onto a body, etc. of the vehicle 410 in which the battery 400 is installed, by the NFC communication unit 140.

The NFC communication unit 140 is also capable of functioning as means for acquiring identification information (power supply source ID) e1 unique to the power supply source 300 and means for acquiring identification information (electric energy-measurement apparatus ID) m1 unique to a electric energy-measurement apparatus 500 that measures an electric energy of a power supplied from the power supply source 300 to the battery 400.

As the forgoing near field communication method in the NFC communication unit 140, a power line superposed communication method in which a signal is superposed on a cable (power line) used for a power supply. The NFC communication unit 140 may be configured with, for example, a communication module mounted with a reader/writer unit, an interface unit for connecting to the cable, or the like, which are necessary for the power line superposed communication.

It is noted that, in the second embodiment, as the near field communication method in the NFC communication unit 140, other near field wireless communication method such as a near field wireless communication via radio waves or light such as FeliCa (registered trademark), an electric field communication, a wireless LAN communication, a communication via sound or vibration, or the like may be used, or two or more kinds of near field communication method may be used by combining For example, a communication method by an electric field communication of communicating via an electric field generated in an external space near a surface of a power cable may be used. The foregoing "electric field communication" is a communication using an electric field generated on a surface of an object or a human body and is also called "human body communication ", "human-body near-field communication ", "quasi-electrostatic field communication" and so on. When using this "electric field communication", the NFC communication unit 140, for example, may be configured with an electric field communication module including a processor, a transceiver, an amplifier, a mixer circuit, a sensor for receiving, etc. which are necessary for the electric field communication.

The camera which functions as the imaging means is capable of taking an image of electrically driven vehicle 410 incorporated with the battery 400 that is the power supply target, spontaneously or in response to a request from the authentication server 750 or the fee-charging apparatus 700, based on various determination results in the power-supply control apparatus 100.

The user apparatus 200 is an apparatus capable of transmitting the user ID or the user apparatus ID by the NFC communication, and may be mounted in the vehicle 410 or connected to the battery 400, for example. The user apparatus 200 may also be a portable apparatus so that a user can put the user apparatus 200 close to or into contact with the power cable of the power supply target such as the battery 400, when using a power supply via the power-supply control apparatus 100. The user apparatus 200 is provided with an NFC communication unit (not shown) which functions as means for transmitting the user ID or the user apparatus ID to the power-supply control apparatus 100 by the NFC communication. This NFC communication unit may also be configured with, for example, the aforementioned communication module. The user apparatus 200 may also be configured so as to include an operation unit such as a button, etc. for instructing a start and stop, etc. of using a power supply. The user apparatus 200 may also be a mobile communication terminal such as a mobile telephone, a smartphone, PHS, etc. in which the function of NFC communication is incorporated. It is noted that the NFC communication unit of the user apparatus 200 may transmit the user ID or the user apparatus ID spontaneously or in response to a request from the power-supply control apparatus 100.

The battery 400 supplies a power to an electric motor, etc. that is a drive source of the vehicle 410. The battery 400 includes an NFC communication unit (not shown) which functions as means for transmitting the battery ID to the power-supply control apparatus 100 by the NFC communication. This NFC communication unit may also be configured with, for example, the aforementioned communication module. It is noted that the NFC communication unit of the battery 400 may transmit the battery ID spontaneously or in response to a request from the power-supply control apparatus 100.

The vehicle-communication apparatus 420 is attached onto a casing or the like of the vehicle 410 so as to locate at a position close to or into contact with an external surface of a charging cable 401 connected to the battery 400. The vehicle-communication apparatus 420 includes an NFC communication unit (not shown) which functions as means for transmitting the vehicle ID to the power-supply control apparatus 100 by the NFC communication. This NFC communication unit may be configured with, for example, the aforementioned communication module. It is noted that the vehicle-communication apparatus 420 may transmit the vehicle ID spontaneously or in response to a request from the power-supply control apparatus 100.

The power supply source 300 is, for example, connected to a power line which supplies power transmitted from power generation equipment of an electric power company and transformed to a predetermined voltage. The general-purpose power outlet 302 capable of connecting to the power-supply control apparatus 100 by inserting is provided at an end of a power cable 301 of the power supply source 300. The power supply source 300 may include an NFC communication unit (not shown) which functions as means for transmitting the power supply source ID to the power-supply control apparatus 100 by the NFC communication. It is noted that the power supply source 300 may transmit the power supply source ID spontaneously or in response to a request from the power-supply control apparatus 100.

The electric energy-measurement apparatus 500 is an apparatus of measuring an accumulated electric energy [Wh] of power supplied from the power supply source 300 to the power supply target such as the battery 400 or the like. As the electric energy-measurement apparatus 500, for example, an induction type watthour meter, an electronic type watthour meter or the like may be used. The electric energy-measurement apparatus 500 includes an NFC communication unit (not shown) which functions as means for transmitting the electric energy-measurement apparatus ID to the power-supply control apparatus 100 by the NFC communication. This NFC communication unit may also be configured with, for example, the aforementioned communication module. It is noted that the electric energy-measurement apparatus 500 may transmit the electric energy-measurement apparatus ID spontaneously or in response to a request from the power-supply control apparatus 100.

The fee-charging apparatus 700 is an apparatus of performing a fee-charging process with respect to a power supply from the power supply source 300 to the power supply target such as the battery 400, or the like. The fee-charging apparatus 700 is configured with, for example, a computer apparatus such as a server and has functions of various kinds of data processing, a communication via the network 600 including a wired or wireless communication line, and a database in which various data are stored so as to be searched.

The fee-charging apparatus 700 receives the user ID or the user apparatus ID as the power-use-side identification information and the power-use information relating to a power supplied from the power supply source 300 to the battery 400 through the cable, from the power-supply control apparatus 100 via the network 600, and performs a fee-charging process based on the power-use-side identification information and the power-use information.

The fee-charging apparatus 700 may be configured so as to perform an authentication process in place of the power-supply control apparatus 100. In this configuration, for example, the fee-charging apparatus 700 performs an authentication process of detecting whether a user ID received from the power-supply control apparatus 100 matches with a user ID stored in the memory unit, and transmits a result of the authentication process to the power-supply control apparatus 100. The power-supply control apparatus 100 performs a control to turn on the switch unit 110 (for closing the relay) when receiving the result showing success of the authentication process, that is, a result showing that the both user IDs match each other. On the other hand, when the authentication is not succeeded, that is, the both user IDs do not match each other, the control of the switch unit 110 to turn on (for closing the relay) is not performed.

The fee-charging apparatus 700 may further receive at least one of the battery ID and the vehicle ID in addition to the user ID and the user apparatus ID as the power-use-side identification information, from the power-supply control apparatus 100 via the network 600, and may use the power-use-side identification information for the authentication process and the fee-charging process. The fee-charging apparatus 700 may further receive at least one of the power-supply control apparatus ID, the power supply source ID and the electric energy-measurement apparatus ID as the power-supply-side identification information, from the power-supply control apparatus 100 via the network 600, and may use the power-supply-side identification information for the authentication process and the fee-charging process.

The database of the fee-charging apparatus 700 stores, for example, as shown in Table 3, fee-charge setting data including two or more kinds of power-use-side identification information, two or more kinds of power-supply-side identification information, and fee-charge-target information predetermined to each of combination sets between the two or more kinds of power-use-side identification information and the two or more kinds of power-supply-side identification information. In the example of Table 3, a user apparatus ID, a user ID, a power supply target ID (a battery ID and a vehicle ID) are stored as the two or more kinds of power-use-side identification information, and a power-supply control apparatus ID, a power supply source ID and an electric energy-measurement apparatus ID are stored as the two or more kinds of power-supply-side identification information. As the foregoing fee-charge setting information used for the fee-charging process, a unit price of fee-charging and information on the basis for fee-charging using the unit price (for example, an electric energy or a use time) are also stored in addition to the fee-charging target information.

It is noted that the data accumulated in the power-utilization management table of the database of the fee-charging apparatus 700 may be used for various kinds of analysis of a supply and use of power. For example, by using the data accumulated in the power-utilization management table, it is capable of analyzing a portfolio of power-supply side (for example, each percentage of power supply sources 300 such as a thermal power generation, a nuclear power generation, a hydroelectric power generation and a solar photovoltaic generation) and a portfolio of power-use side

TABLE 3

| Power-use side information | | | | Power-supply side information | | | Fee-charge setting information | | |
|---|---|---|---|---|---|---|---|---|---|
| | | Power supply target ID | | Power supply control | Power supply | Electric energy measurement | | | |
| User apparatus ID | User ID | Battery ID | Vehicle ID | apparatus ID | source ID | apparatus ID | Fee-charging target | Unit price | Basis for fee-charging |
| a1 | u1 | b1 | c1 | p1 | e1 | m1 | u1 | *** | Electric energy |
| a1 | u1 | b2 | c2 | p1 | e1 | m1 | b2 | *** | Use time |
| a2 | u2 | b1 | c3 | p1 | e1 | m1 | a2 | *** | Electric energy |
| a2 | u2 | b2 | c4 | p1 | e1 | m1 | a2 | *** | Electric energy |
| ... | ... | ... | ... | ... | ... | ... | ... | ... | ... |
| ... | ... | ... | ... | ... | ... | ... | ... | ... | ... |

The fee-charging apparatus 700 receives at least one kind of the power-supply-side identification information, at least one kind of the power-use-side identification information and the power-use information from the power-supply control apparatus 100, and stores the received information by adding the received information to a power-utilization management table created in the foregoing database, which is exemplified in Table 4. The fee-charging apparatus 700 refers to the fee-charge setting data in the foregoing database based on the power-supply-side identification information and the power-use-side identification information received from the power-supply control apparatus 100, and acquires fee-charging related information such as the fee-charging target. Then, the fee-charging apparatus 700 performs a fee-charging process based on the acquired fee-charging related information and the power-use information received from the power-supply control apparatus 100.

(for example, each percentage of various attributes of users, each percentage of various power supply targets), with respect to all users as a whole. It is also capable of analyzing how much each of the users uses an electric energy of a power from which type of the power supply source 300 via which power-supply control apparatus 100. The data accumulated in the power-utilization management table of the database in the fee-charging apparatus 700 or the authentication server 750 may be used for a management of information such as a charging capacity, the number of times of charging, deterioration, etc. of a battery which is a lease target, when leasing the battery by a leasing company.

The authentication server 750 is an apparatus of performing an authentication process for determining whether or not to permit a power supply from the power supply source 300 to the power supply target such as the battery 400, etc. The authentication server 750 is configured with, for example, a

TABLE 4

| Power-use side information | | | | Power-supply side information | | | Fee-charge information | | | Power supply related information | | |
|---|---|---|---|---|---|---|---|---|---|---|---|---|
| | | Power supply target ID | | Power supply control | Power supply | Electric energy measurement | | | | | Use time | Electric energy |
| User apparatus ID | User ID | Battery ID | Vehicle ID | apparatus ID | source ID | apparatus ID | Fee-charging target | Unit price | Basis for fee-charging | Use Date | (hour) | (kWh) |
| a1 | u1 | b1 | c1 | p1 | e1 | m1 | u1 | *** | Electric energy | 2013/1/15 | 3 | 6 |
| a1 | u1 | b2 | c2 | p1 | e1 | m1 | b2 | *** | Use time | 2013/1/20 | 5 | 10 |
| ... | ... | ... | ... | ... | ... | ... | ... | ... | ... | ... | ... | ... |
| ... | ... | ... | ... | ... | ... | ... | ... | ... | ... | ... | ... | ... | computer apparatus and has functions of various kinds of data processing, a communication via the network 600 including a wired or wireless communication line, and a database in which various data are stored so as to be searched.

The authentication server 750 receives the user ID or the user apparatus ID as the power-use-side identification information and the power-use information relating to a power supplied from the power supply source 300 to the battery 400 through the cable, from the power-supply control apparatus 100 via the network 600, and performs an authentication process based on the power-use-side identification information.

The authentication server 750 also performs, for example, an authentication process of detecting whether a user ID received from the power-supply control apparatus 100 matches with a user ID stored in the memory unit, and transmits the result of the authentication process to the power-supply control apparatus 100. The power-supply control apparatus 100 performs a control to turn on the switch unit 110 (for closing the relay) when receiving a result showing success of the authentication process, that is, a result showing that the both user IDs match each other. On the other hand, when the authentication is not succeeded, that is, the both user IDs do not match each other, the control of the switch unit 110 to turn on (for closing the relay) is not performed.

The authentication server 750 may further receive at least one of the battery ID and the vehicle ID in addition to the user ID or the user apparatus ID as the power-use-side identification information, from the power-supply control apparatus 100 via the network 600, and may use the power-use-side identification information for the authentication process or the fee-charging process. The authentication server 750 may further receive at least one of the power-supply control apparatus ID, the power supply source ID and the electric energy-measurement apparatus ID as the power-supply-side identification information, from the power-supply control apparatus 100 via the network 600, and may use the power-supply-side identification information for the authentication process or the fee-charging process.

In the database of the authentication server 750, for example, a power-utilization management table as shown in Table 5 is created. In this power-utilization management table, with respect to each of the power-use-side identification information (user ID, user apparatus ID, vehicle ID, battery ID) and the power-supply-side identification information (power supply source ID), power-supply permission information ("OK" or "NG" ("not OK")) indicating whether a power supply is permitted or not, and information of a reason ("theft", "loss", "insufficient account balance", etc.) and an additional process level when the power supply is not permitted (the power-supply permission information is "NG" ("not OK")), are stored. The foregoing "insufficient account balance" shows a state in which a balance of bank account used for a withdrawal of fee-charging is insufficient and it is impossible to perform a fee-charging. The foregoing reason when the power supply is not permitted (the power-supply permission information is "NG" ("not OK")) is registered, for example, by providing information from a user, a police agency, etc.

TABLE 5

| ID | ID Type | Power-supply permission information | Reason | Additional process level |
|---|---|---|---|---|
| a1 | User apparatus ID | OK | | |
| a2 | User apparatus ID | OK | | |
| a3 | User apparatus ID | OK | | |
| ... | ... | ... | ... | ... |
| u1 | User ID | OK | | |
| u2 | User ID | OK | | |
| u3 | User ID | NG (not OK) | Insufficient account balance | |
| ... | ... | ... | ... | ... |
| b1 | Battery ID | OK | | |
| b2 | Battery ID | NG (not OK) | Theft | Level 1 (log recording) |
| b3 | Battery ID | NG (not OK) | Theft | Level 2 (log recording, notification) |
| b4 | Battery ID | NG (not OK) | Loss | Level 1 (log recording) |
| ... | ... | ... | ... | ... |
| c1 | Vehicle ID | OK | | |
| c2 | Vehicle ID | NG (not OK) | Theft | Level 3 (log recording, notification, imaging by camera) |
| c3 | Vehicle ID | OK | | |
| ... | ... | ... | ... | ... |
| e1 | Power supply source ID | OK | | |
| e2 | Power supply source ID | OK | | |
| e3 | Power supply source ID | OK | | |
| ... | ... | ... | ... | ... |
| ... | ... | ... | ... | ... |

In Table 5, for example, each of a battery and a vehicle are in a state of theft when a battery ID is "b2" and "b3" and a vehicle ID is "c2", a battery is in a state of loss when a battery ID is "b4". When a user ID is "u3", a user is in state of insufficient account balance in which it is impossible to perform a fee-charging to the user.

In Table 5, with respect to the ID (ID of "NG" ("not OK")) used when a power supply is not permitted due to a theft and loss, an additional process level according to the situation of the theft and loss is recorded. For example, a level 1 (log recording) is set as the additional process level when the battery ID is "b2" and "b4", a level 2 (log recording and notification) is set as the additional process level when the battery ID is "b3", a level 3 (logging, notification and imaging by a camera) is set as the additional process level when the vehicle ID is "c2". When receiving these ID, an additional process corresponding to each of the levels is performed based on the information in Table 5.

Information (telephone number, mail address) of notification destinations (an authorized owner of a battery or a vehicle, a police agency, etc.) that is a target of the foregoing notification is stored, for example, in the power-supply control apparatus 100 or the authentication server 750.

The authentication server 750 performs an authentication process of determining whether a power supply is permitted or not based on the table in Table 5, when receiving at least one of the two or more kinds of power-use-side identification information (user ID, user apparatus ID, vehicle ID, battery ID) from the power-supply control apparatus 100. In this authentication process, when receiving the two or more kinds of power-use-side identification information (user ID, user apparatus ID, vehicle ID, battery ID) from the power-supply control apparatus 100, for example, if the "power-supply permission information" corresponding to at least one of the received two or more kinds of power-use-side identification information in Table 5 is "NG" ("not OK"), a power supply to a battery installed in a vehicle that is a power supply target corresponding to the power-supply permission information is not permitted. In other words, when the "power-supply permission information" corresponding to all of the two or more kinds of power-use-side identification information (user ID, user apparatus ID, vehicle ID, battery ID) received from the power-supply control apparatus 100 in Table 5 is "OK", a power supply to a battery installed in a vehicle that is a power supply target corresponding to the power-supply permission information is permitted.

It is noted that, in Table 5, the two or more kinds of power-use-side identification information (user ID, user apparatus ID, vehicle ID, battery ID) may include the same format (4 octets or 8 octets) to each other so as to determine easily whether a power supply is permitted or not for each of the IDs. The data accumulated in the power-utilization management table of the database in the authentication server 750 may be also used for various kinds of analysis of a supply and use of power.

Figure 5:
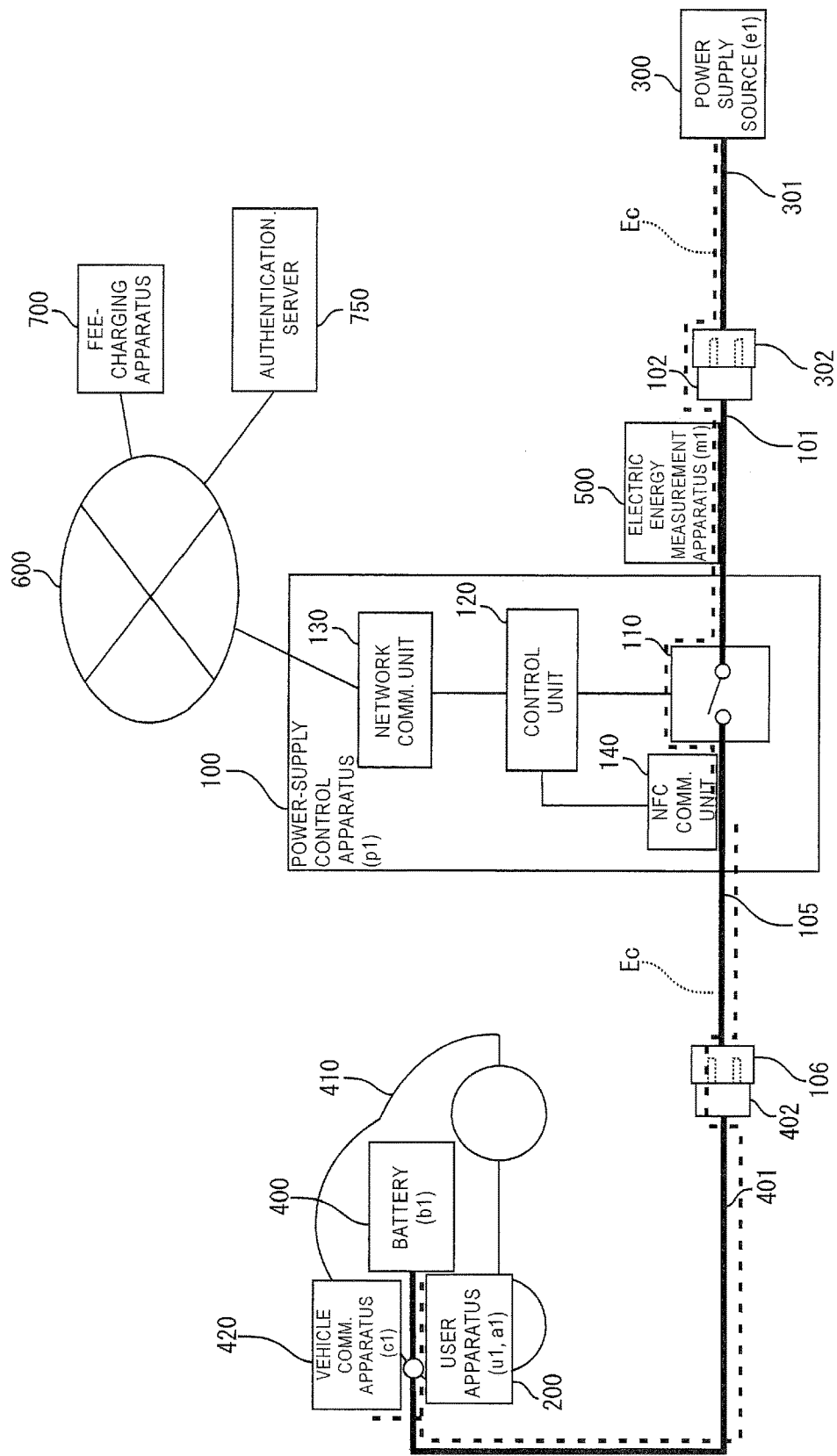
FIG. 5 is a schematic diagram showing a state capable of supplying an electric power in the power supply system of the second embodiment.

FIG. 5 is a schematic diagram showing a state capable of supplying an electric power in the power supply system of the second embodiment. A path indicated with a broken line Ec in the figure shows schematically a path capable of communicating by the NFC communication.

In FIG. 5, when connecting the general-purpose power outlet 106 of the cable 105 of the power-supply control apparatus 100 with the general-purpose power plug 402 of the cable 401 connected to the battery 400, the power-supply control apparatus 100 is capable of performing the NFC communication with various apparatuses on the power-use side. Specifically, the power-supply control apparatus 100 is capable of transmitting and receiving various data and control commands between the user apparatus 200, the battery 400 in the vehicle 410 and the vehicle-communication apparatus 420 mounted onto the vehicle 410, by the NFC communication.

Moreover, when connecting the general-purpose power plug 102 of the cable 101 of the power-supply control apparatus 100 with the general-purpose power outlet 302 of the cable 301 connected to the power supply source 300, the power-supply control apparatus 100 is also capable of performing an NFC communication with various apparatuses on the power supply side. Specifically, the power-supply control apparatus 100 is capable of transmitting and receiving various kinds of information such as IDs between the electric energy-measurement apparatus 500 held on the cable 101 and the NFC communication apparatus (not shown) installed in the power supply source 300 by the NFC communication.

Figure 6:
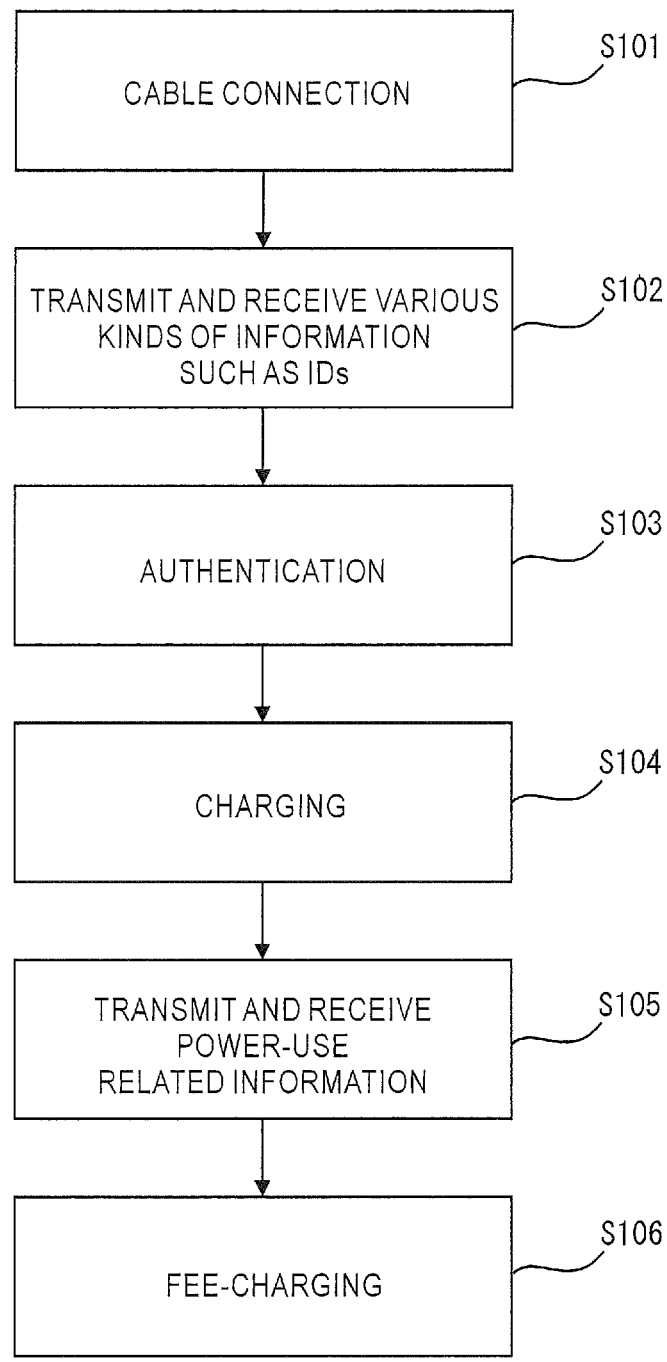
FIG. 6 is a flow chart showing one example of procedures when charging a battery of a vehicle by utilizing a power supplied with the power supply system of the second embodiment.

FIG. 6 is a flow chart showing one example of procedures when charging a battery of a vehicle by utilizing a power supplied with the power supply system of the embodiment shown in the foregoing FIG. 5.

In FIG. 6, to begin with, a user who desires to charge the battery 400 of the vehicle 410 connects the cable 401 and 105 each other by inserting the general-purpose power plug 402 of the cable 401 for charging to the general-purpose power outlet located at the end portion of the cable 105 of the power-supply control apparatus 100 (S101).

In this step, since the user apparatus 200 is mounted in the vehicle 410 or connected with the battery 400, an operation of the user apparatus 200 by the user is not particularly necessary. When the user apparatus 200 is a portable user apparatus operated by the user, the user performs a setting of the user apparatus 200 by putting the user apparatus 200 into contact with or close to an arbitrary portion of the cable 401 for charging. When an operation unit such as a button, etc used to request for starting a power supply is provided on the user apparatus 200, the user operates the operation unit of the user apparatus 200 when performing the setting of the user apparatus 200.

Next, various kinds of information such as IDs are transmitted and received between the power-supply control apparatus 100 and other apparatuses by the NFC communication (S102).

For example, the user apparatus 200 spontaneously transmits the user ID or the user apparatus ID preset in the user apparatus 200 to the power-supply control apparatus 100 by the NFC communication. At this juncture, the battery 400 may spontaneously transmit the battery ID preset in the battery 400 to the power-supply control apparatus 100 by the NFC communication. Furthermore, the vehicle-communication apparatus 420 may spontaneously transmit the vehicle ID preset in the vehicle-communication apparatus 420 to the power-supply control apparatus 100 by the NFC communication.

Moreover, a communication apparatus (not shown) of the power supply source 300 may spontaneously transmit the power supply source ID preset in this communication apparatus to the power-supply control apparatus 100 by the NFC communication. Further, the electric energy-measurement apparatus 500 may spontaneously transmit the electric energy-measurement apparatus ID preset in the electric energy-measurement apparatus 500 to the power-supply control apparatus 100 by the NFC communication.

It is noted that various kinds of ID information such as the foregoing battery ID, vehicle ID, power supply source ID, electric energy-measurement apparatus ID, etc. may transmitted to the power-supply control apparatus 100 in response to a request from the power-supply control apparatus 100 or the user apparatus 200.

The power-supply control apparatus 100 transmits the various kinds of ID information received from each of the apparatuses to the fee-charging apparatus 700 and the authentication server 750 via the network 600.

Next, the authentication server 750 performs an authentication process of determining whether or not to permit the use of power supply requested by the foregoing user based on the various kinds of ID information received from the power-supply control apparatus 100 and the ID information for authentication stored in the database, and transmits the result of the authentication process to the power-supply control apparatus 100 (S103). It is noted that the authentication process may be performed by the power-supply control apparatus 100 or the fee-charging apparatus 700.

Next, the power-supply control apparatus 100 performs a control of the switch unit 110, etc. based on the authentication result received from the authentication server 750. For example, when the authentication result is a positive result showing that the authentication process is succeeded, the power-supply control apparatus 100 performs a control to turn on the switch unit 110 (for closing the relay), by which a charge of the battery 400 is started (S104). Then, the power-supply control apparatus 100 performs a control to turn off the switch unit 110 (for opening the relay) at a predetermined timing, by which the charge of the battery 400 is terminated (S104). The predetermined timing for terminating the charge may be a timing when a predetermined charge time elapses from the start of charge, a timing when receiving a command for requesting a termination of the power supply from any one of the apparatuses (for example, the user apparatus 200, the battery 400, the vehicle-communication apparatus 420, the electric energy-measurement apparatus 500) capable of communicating by the NFC communication, a timing when receiving a command for requesting a termination of the power supply from the authentication server 750, or the like.

Next, the power-supply control apparatus 100 transmits power-use information relating to power supplied from the power supply source 300 to the battery 400 through the cable, to the fee-charging apparatus 700 via the network 600 (S105). As the foregoing power-use information transmitted to the fee-charging apparatus 700 in this step, for example, an accumulated electric energy, date and time, the start time and the finish time of a power supply, a power supply time (=finish time−start time), etc. when supplying power to the battery 400 can be exemplified. With respect to the accumulated electric energy, the power-supply control apparatus 100 is capable of acquiring the accumulated electric energy from the electric energy-measurement apparatus 500 by the NFC communication.

Next, the fee-charging apparatus 700 performs a fee-charging process based on the power-use information received from the power-supply control apparatus 100 (S106). This fee-charging process may be performed by using various kinds of information received from the power-supply control apparatus 100 when the aforementioned authentication process is performed, in addition to the power-use information.

Figure 7:
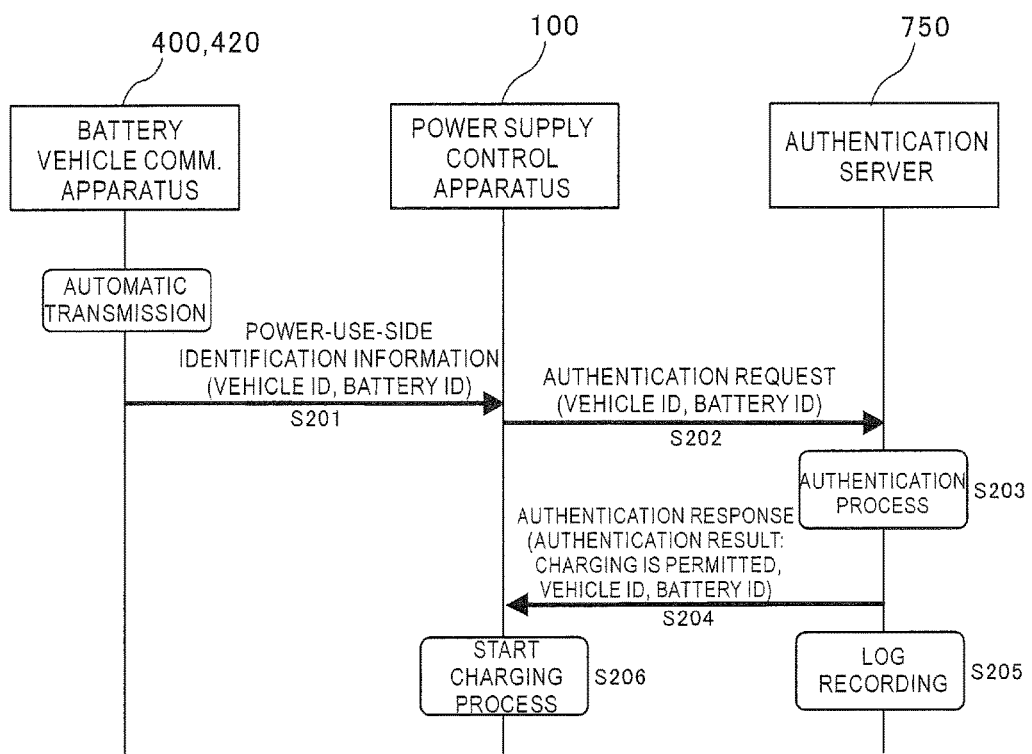
FIG. 7 is a sequence flow diagram showing one example of procedures of an authentication process performed before a charging process for the battery of the vehicle in the power supply system of the second embodiment.

FIG. 7 is a sequence flow diagram showing one example of procedures of an authentication process performed before a charging process for the battery of the vehicle. This example is an example when permitting a power supply to the battery (charging process).

In FIG. 7, the power-supply control apparatus 100 receives the vehicle ID and the battery ID as the authentication ID transmitted from the power supply target 400 side (S201), and then, transmits an authentication request including these vehicle ID and battery ID to the authentication server 750 (S202). This authentication request may include the aforementioned user ID and user apparatus ID. Furtheremore, when the power-supply control apparatus 100 receives the vehicle ID and battery ID from two or more power supply targets 400, the vehicle IDs and battery IDs for all of the two or more power supply targets 400 may be included in one authentication request.

Next, the authentication server 750 performs an authentication process of determining whether or not to permit a power supply to the power supply target based on the vehicle ID and battery ID of the power supply target which is received from the power-supply control apparatus 100 and the aforementioned power-utilization management table shown in FIG. 6 (S203). In this example, both of the power-supply permission information for the vehicle ID and battery ID are "OK", the authentication server 750 performs an authentication process so as to permit the power supply to the power supply target and transmits an authentication response including a result of the authentication process to the power-supply control apparatus 100 (S204). This authentication response includes, for example, a transmission interval of continuous charge request (for example, 10 min, 30 min, etc.) and information for identifying whether this charging period is the last charging period of a series of charging processes, in addition to an authentication ID including the vehicle ID and battery ID. The foregoing transmission interval of continuous charge request is a time interval when a continuous charge request for requesting an authentication with respect to a continuous charging is transmitted from the power-supply control apparatus 100 to the authentication server 750.

The authentication server 750 records a log relating to the authentication process performed with respect to the power-supply control apparatus 100 to which the authentication response of permitting the foregoing power supply is transmitted (S205), for example, as shown in the row of serial number (SN)=0002 of the following Table 6.

TABLE 6

| | | | | Power-use side information | | | | Power-supply side information | | | | | | |
|---|---|---|---|---|---|---|---|---|---|---|---|---|---|---|
| | | | | User appa- | | Power supply target ID | | Power supply control | Power supply | Electric energy meseasure-ment | Power-supply related information | | | Power supply |
| Serial number (SN) | Business type | Location | Comm. method | ratus ID | User ID | Battery ID | Vehicle ID | apparatus ID | source ID | apparatus ID | Start time | Finish time | Electric energy (kWh) | permission |
| ... | ... | ... | ... | ... | ... | ... | ... | ... | ... | ... | ... | ... | ... | ... |
| 0002 | g1 | Yokohama ···ku | NFC | a1 | u1 | b1 | c1 | p1 | e1 | m1 | 2014/1/15 17:00:00 | 2014/1/15 17:30:00 | 6 | OK |
| 0003 | g2 | Tokyo ···ku | NFC | a3 | u3 | b3 | c3 | p1 | e1 | m1 | 2014/1/20 13:00:00 | 2014/1/20 13:00:00 | 0 | NG(not OK) (theft) |
| ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... |

Next, the power-supply control apparatus 100 starts a charging process of supplying power to the battery corresponding to the vehicle ID and battery ID included in an authentication response based on the authentication response received from the authentication server 750 (S206).

Figure 8:
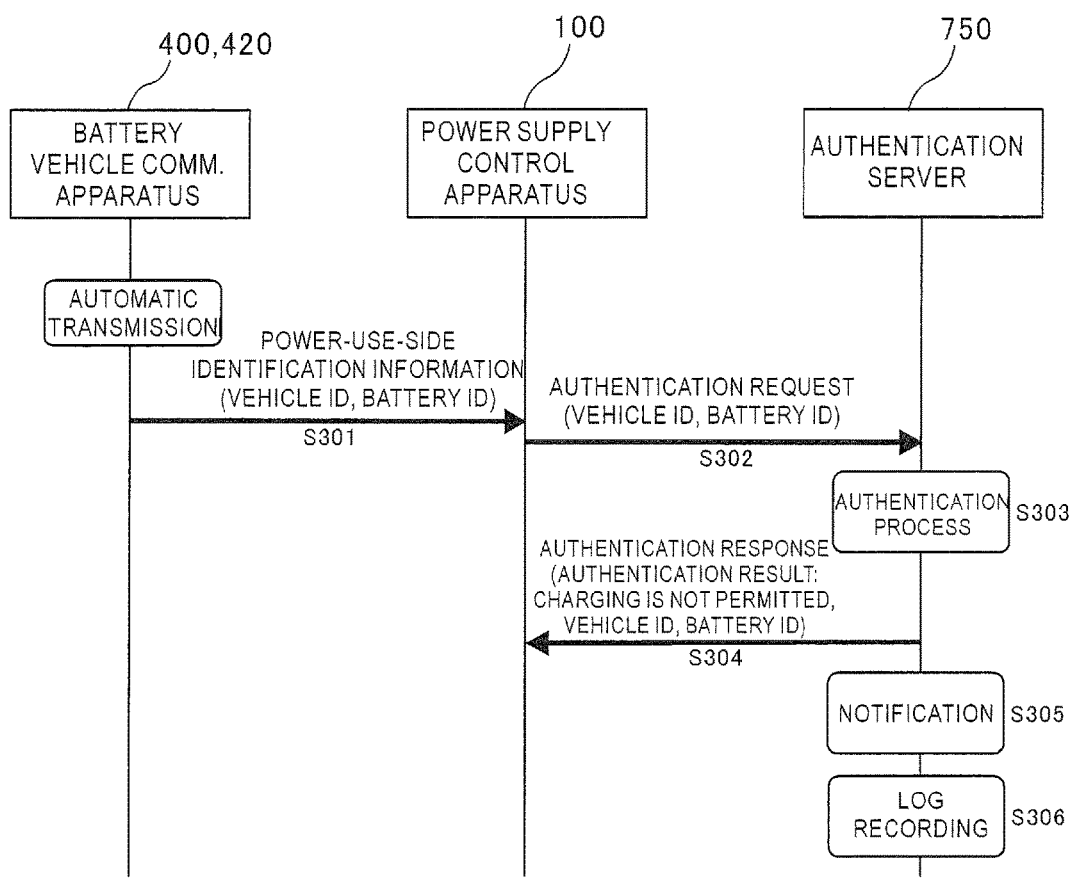
FIG. 8 is a sequence flow diagram showing one example of procedures of an authentication process performed before charging process for the battery of the vehicle in the power supply system of the second embodiment.

FIG. 8 is a sequence flow diagram showing one example of procedures of an authentication process performed before charging process for the battery of the vehicle. This example is an example in which the battery is stolen and a power supply to the battery (charging process) is not permitted.

In FIG. 8, the power-supply control apparatus 100 receives the vehicle ID and the battery ID as the authentication ID transmitted from the power supply target 400 side (S301), and then, transmits an authentication request including these vehicle ID and battery ID to the authentication server 750 (S302).

Next, the authentication server 750 performs an authentication process of determining whether or not to permit a power supply to the power supply target based on the vehicle ID and battery ID of the power supply target which is received from the power-supply control apparatus 100 and the aforementioned power-utilization management table shown in FIG. 6 (S303). In this example, the battery is a stolen one, the power-supply permission information for the battery ID is "NG" ("not OK") (information), and the authentication server 750 performs an authentication process so as not to permit the power supply to the power supply target and transmits an authentication response including the result of the authentication process to the power-supply control apparatus 100 (S304).

The authentication server 750 also notifies that the power supply to the stolen battery is requested, to a predetermined notification destination, based on the aforementioned additional process level for the battery ID=b3 shown in Table 5 (S305). The notification destination is, for example, a predetermined mail address or telephone number of an authorized owner of the battery, a police agency, a leasing company, etc. This notification may include a current location of the battery, that is, address information of the power-supply control apparatus 100.

The authentication server 750 also records a log relating to the authentication process performed with respect to the power-supply control apparatus 100 to which the authentication response of not permitting the foregoing power supply is transmitted (S306), for example, as shown in the row of serial number (SN)=0003 of the aforementioned Table 6.

In the second embodiment described above, it is noted that when receiving the vehicle ID and battery ID with respect to the one or more battery of other power supply target after starting the power supply to the battery 400 from the power-supply control apparatus 100, the power-supply control apparatus 100 may transmit an authentication request for requesting an authentication process for the received vehicle ID and battery ID to the authentication server 750.

In the second embodiment described above, when receiving the information that the battery 400 is a stolen article from the authorized owner, etc. after starting the power supply to the battery 400 from the power-supply control apparatus 100, the authentication server 750 may transmit a request including a command of compulsive charge-stop instruction for terminating the power supply to the battery 400 (charging) to the power-supply control apparatus 100 at an arbitrary timing. This request including the command of compulsive charge-stop instruction may be transmitted to the power-supply control apparatus 100 at an arbitrary timing by an asynchronous communication, unlike the aforementioned authentication response to the authentication request. The power-supply control apparatus 100 terminates the power supply to the battery 400 (charging) based on the request including the command of compulsive charge-stop instruction received from the authentication server 750, and transmits a compulsive charge-stop response to the authentication server 750.

According to the second embodiment described above, it is capable of controlling a power supply to the battery 400 used by the user and performing a fee-charging with respect to the power supply to the battery 400 used by the user, without providing a conventional power-use apparatus directly connected to a lead wire of a cable. Therefore, it is capable of performing a control and a fee-charging with respect to a power supply with fewer restrictions in configuration than a conventional system. Furtheremore, when starting the use of power supply, it is not necessary for the user to operate the user apparatus 200 by mounting the user apparatus 200 in the vehicle 410 or connecting the user apparatus 200 to the battery 400. Moreover, since a communication between the user apparatus 200 and the power-supply control apparatus is the NFC communication, if the user apparatus 200 is an portable user apparatus, when a user uses a power supply to the battery 400, the user is enough to perform a simple operation of attaching the user apparatus 200 on a surface of the cable 401 or making it close to the surface. Further, it is capable of receiving a power supply to the battery 400 even at a location where a conventional power-use apparatus that is directly connected to a lead wire of a cable is not provided. Accordingly, the convenience of a user improves.

According to the second embodiment described above, the fee-charging apparatus 700 is capable of determining a fee-charging target corresponding to each of various combination sets between the two or more kinds of power-use-side identification information and the two or more kinds of power-supply-side identification information. Furthermore, the fee-charging apparatus 700 is capable of performing a fee-charging process for a fee-charging target corresponding to a combination set between the at least one kind of power-supply-side identification information and the at least one kind of power-use-side identification information based on the power-use information, when receiving the at least one kind of power-supply-side identification information, the at least one kind of power-use-side identification information and the power-use information, from the power-supply control apparatus 100 via a wired or wireless communication line 600. Accordingly, it is capable of performing various modes of fee-charging for mutually different combination sets between the power-use-side identification information and the power-supply-side identification information.

Moreover, it is capable of performing an authentication of determining whether or not to permit a power supply from the power supply source 300 to the battery 400 with respect to each of various combination sets of the two or more kinds of power-use-side identification information, before the power supply from the power supply source 300 to the battery 400.

It is noted that process steps and configuration elements in each of the power-supply control apparatus 100, the user apparatus 200, the communication unit installed in the battery 400, the vehicle-communication apparatus 420, the electric energy-measurement apparatus 500, the fee-charging apparatus 700, the authentication server 750, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for using to establish the foregoing configuration elements may be implemented with a program (for example, a code such as a procedure, a function, a module, an instruction, etc.) for performing a function described in the present specification. In general, any computer/processor readable medium of clearly materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 100 power-supply control apparatus
101 cable
102 general-purpose power plug
105 cable
106 general-purpose power outlet
110 switch unit
120 control unit
130 network-communication unit
140 electric field communication unit
200 user apparatus
300 power supply source
301 cable
302 general-purpose power outlet
400 battery
410 vehicle
420 vehicle-communication apparatus
500 electric energy-measurement apparatus
600 network
700 fee-charging apparatus
750 authentication server

The invention claimed is:

1. A power supply system for supplying power from a power supply source to a rechargeable battery installed in a vehicle, comprising:
 a power-supply control apparatus for controlling power supplied from the power supply source to the battery;
 a fee-charging apparatus for performing a fee-charging process with respect to the power supplied from the power supply source to the battery; and
 authentication means for performing an authentication process to determine whether or not to permit the power supplied from the power supply source to the battery,
 wherein the fee-charging apparatus comprises:
  means for receiving two or more kinds of power-use-side identification information of a use side using the power supplied via the power-supply control apparatus, the two or more kinds of power-use-side identification information including vehicle identification information unique to a body of the vehicle and battery identification information unique to the battery, power-supply-side identification information of a supply side supplying the power via the power-supply control apparatus including two or more kinds of power-supply-side identification information of the supply side, and fee-charge-target information predetermined for each of two or more combination sets between the two or more kinds of power-use-side identification information and the two or more kinds of power-supply-side identification information;
  means for receiving power-use information relating to power supplied from the power supply source to the battery via the power-supply control apparatus, from the power-supply control apparatus via a wired or wireless communication line; and
  means for performing a fee-charging process to determine charges to a fee-charge-target with respect to the power supplied from the power supply source to the battery via the power-supply control apparatus, based on the power-supply-side identification information, the two or more kinds of power-use-side identification information including the vehicle identification information and the battery identification information, the power-use information and the fee-charge-target information, wherein the power-supply control apparatus comprises:
  switching means for opening and closing a power supply path from the power supply source to the battery;
  control means for controlling the switching means;
  means for acquiring the power-supply-side identification information, the two or more kinds of power-use side identification information including the vehicle identification information and the battery identification information, and the power-use information; and
  means for transmitting the power-supply-side identification information, the two or more kinds of power-use-side identification information including the vehicle identification information and the battery identification information, and the power-use information, to the fee-charging apparatus via a wired or wireless communication line, wherein the authentication means comprises means for receiving the two or more kinds of power-use-side identification information including the vehicle identification information and the battery identification information, the two or more kinds of power-supply-side identification information, and power-supply permission information that is predetermined for each of the two or more combination sets between the two or more kinds of power-use-side identification information and the two or more kinds of power-supply side identification information; and performs the authentication process based on the power-use-side identification information and the two or more kinds of power-use-side identification information including the vehicle identification information and the battery identification information which are acquired by the power-supply control apparatus, and the power-supply permission information, and wherein the control means of the power-supply control apparatus controls the switching means to close the power supply path only when, based on a result of the authentication process by the authentication means, the authentication process with respect to each of the vehicle and the battery is successful and the power-supply permission information predetermined for the combination set between the power-use-side identification information and the two or more kinds of power-use-side identification information including the vehicle identification information and the battery identification information which are acquired by the power-supply control apparatus is a kind of information permitting the power supply.

2. The power supply system according to claim 1, wherein the authentication means memorizes theft-occurrence information for the battery; determines whether the battery is stolen or not based on the at least one kind of power-use-side identification information; and performs the authentication process so as not to permit the power supply to the battery when determining that the battery is a stolen one.

3. The power supply system according to claim 2, wherein the authentication means memorizes the theft-occurrence information and a predetermined additional process level when a theft of the battery occurs, with respect to the battery; and performs an additional process based on the additional process level for the battery, together with the authentication process, when determining the battery is stolen.

4. The power supply system according to claim 3, further comprising means for notifying a predetermined notification destination when determining that the battery is a stolen one.

5. The power supply system according to claim 1, wherein the power-supply control apparatus further comprises imaging means for imaging the vehicle in which the battery is installed; and the authentication means acquires image data of the vehicle that is imaged by the imaging means.

6. The power supply system according to claim 1, wherein the authentication means performs the authentication process based on the at least one kind of power-supply-side identification information and the two or more kinds of power-use-side identification information that are acquired by the power-supply control apparatus.

7. The power supply system according to claim 1, wherein the authentication means is provided in the power-supply control apparatus.

8. The power supply system according to claim 1, wherein the authentication means is a server capable of communicating with the power-supply control apparatus via at least one of a mobile communication network, a wireless LAN and a wired LAN.

9. The power supply system according to claim 1, wherein the body of the vehicle comprises means for transmitting vehicle identification information unique to the vehicle body, and the battery comprises means for transmitting battery identification information unique to the battery.

10. The power supply system according to claim 1, further comprising a transmitting apparatus that transmits user identification information unique to a user of power, and wherein the two or more kinds of power-use-side identification information acquired by the power-supply control apparatus includes the user identification information transmitted from the transmitting apparatus.

11. The power supply system according to claim 1, wherein the two or more kinds power-use-side identification information and the at least one kind of power-supply-side identification information are acquired by receiving a response to the acquisition request or a spontaneous transmission from the power-supply control apparatus.

12. The power supply system according to claim 1, wherein the power-supply control apparatus acquires the two or more kinds of power-use-side identification information and the at feast one kind of power-supply-side identification information by a communication via a power supply cable connecting between the power-supply control apparatus and the battery, a near field wireless communication with radio waves or light, an electric field communication, a wireless LAN communication, an NFC superposed on a power line or a communication with sound or vibration.

13. The power supply system according to claim 1, wherein the two or more kinds of power-use-side identification information have the same format each other.

14. The power supply system according to claim 1, wherein the two or more kinds of power-supply-side identification information include identification information unique to the power supply source, identification information unique to the power-supply control apparatus, and identification information unique to an electric energy-measurement apparatus that measures an electric energy of power supplied from the power supply source to the battery.

15. The power supply system according to claim 1, wherein the two or more kinds of power-use-side identification information include identification information unique to a user using a power, identification information unique to a user apparatus used by the user and identification information unique to the battery.

16. The power supply system according to claim 1, wherein the fee-charging target is the user or the battery.

17. The power supply system according to claim 1, wherein the communication between the power-supply control apparatus and the fee-charging apparatus is a communication via at least one of a mobile communication network and a wireless LAN.

18. The power supply system according to claim 2, further comprising means for notifying a predetermined notification destination when determining that the battery is a stolen one.

19. A method of supplying power from a power supply source to a rechargeable battery installed in a vehicle, comprising:

receiving two or more kinds of power-use-side identification information of a use side using the power supplied, the two or more kinds of power-use-side identification information including vehicle identification information unique to a body of the vehicle and battery identification information unique to the battery;

receiving power-supply-side identification information of a supply side supplying the power including two or more kinds of power-supply-side identification information of the supply side;

receiving power-use information relating to power supplied from the power supply source to the battery;

performing a fee-charging process to determine charges to a fee-charge-target with respect to the power supplied from the power supply source to the battery based on the power-supply-side identification information, the two or more kinds of power-use-side identification information, the power-use information and predetermined fee-charge-target information for each of two or more combination sets between the two or more kinds of power-use-side identification information and the two or more kinds of power-supply-side identification information;

performing an authentication process to determine whether or not to permit the power to be supplied from the power supply source to the battery based on the power-use-side identification information, the two or more kinds of power-use-side identification information, and predetermined power-supply permission for each of the two or more combination sets; and controlling power supplied from the power supply source to the battery based at least in part on the determination of whether or not to permit the power to be supplied from the power supply source to the battery, including controlling a switch to open and close a power supply path from the power supply source to the battery, wherein the switch is controlled to be closed, thereby supplying power to the battery, only when the authentication process is successful.

* * * * *